T. CAHILL.
MUSIC GENERATING AND MUSIC DISTRIBUTING APPARATUS.
APPLICATION FILED FEB. 10, 1902. RENEWED JAN. 10, 1914.
1,107,261.
Patented Aug. 18, 1914.
6 SHEETS—SHEET 1.
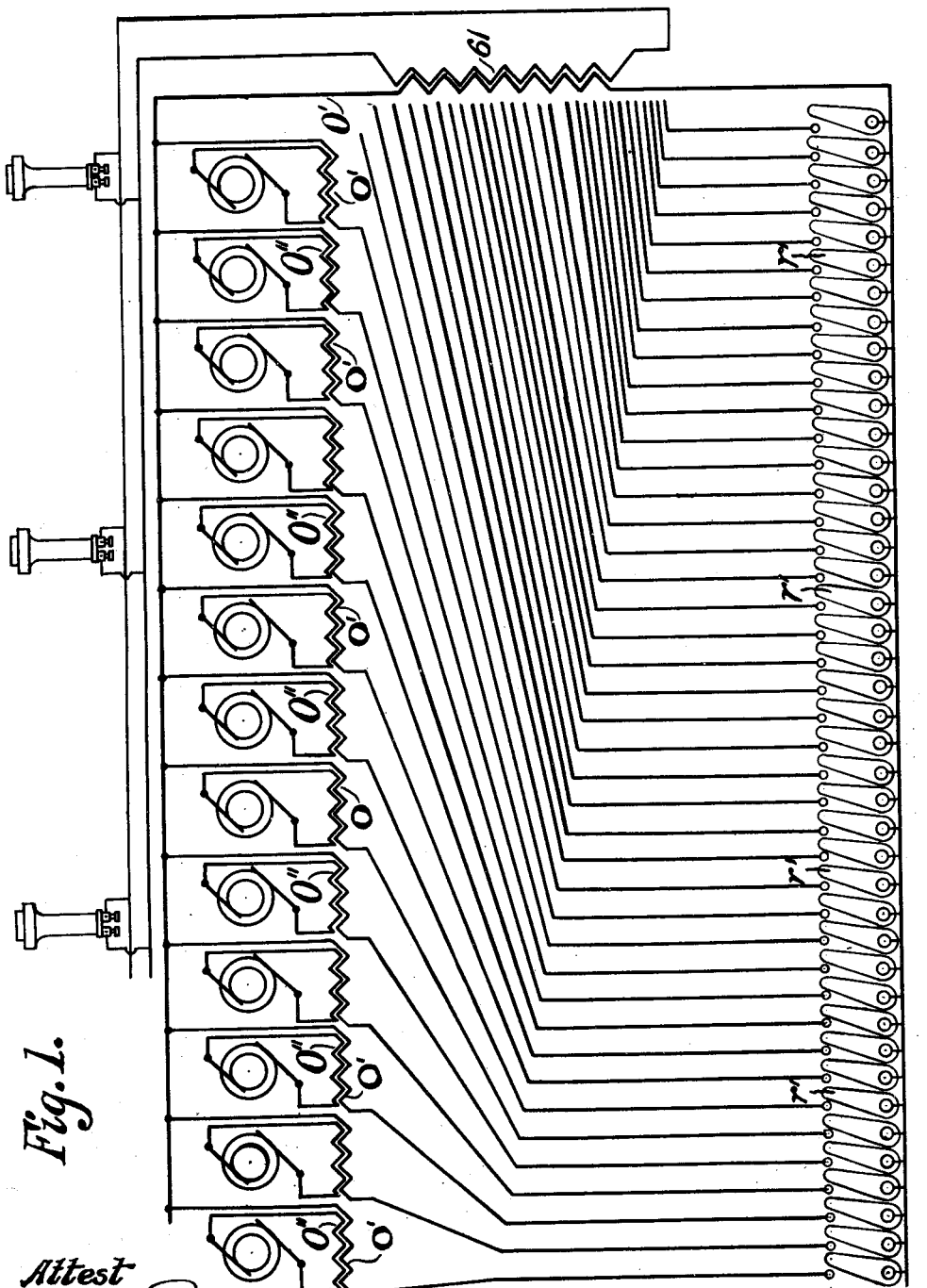

T. CAHILL.
MUSIC GENERATING AND MUSIC DISTRIBUTING APPARATUS.
APPLICATION FILED FEB. 10, 1902. RENEWED JAN. 10, 1914.
1,107,261. Patented Aug. 18, 1914.
6 SHEETS—SHEET 2.
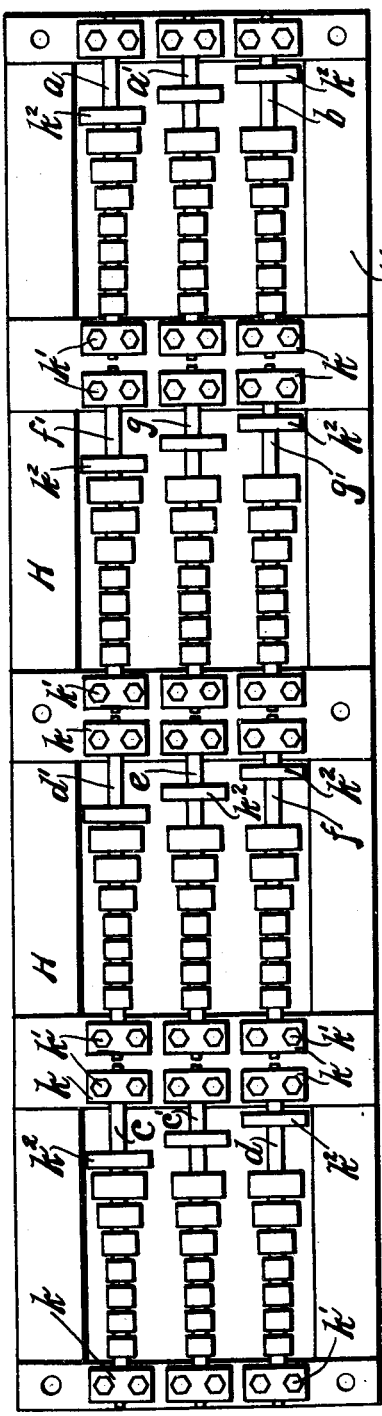
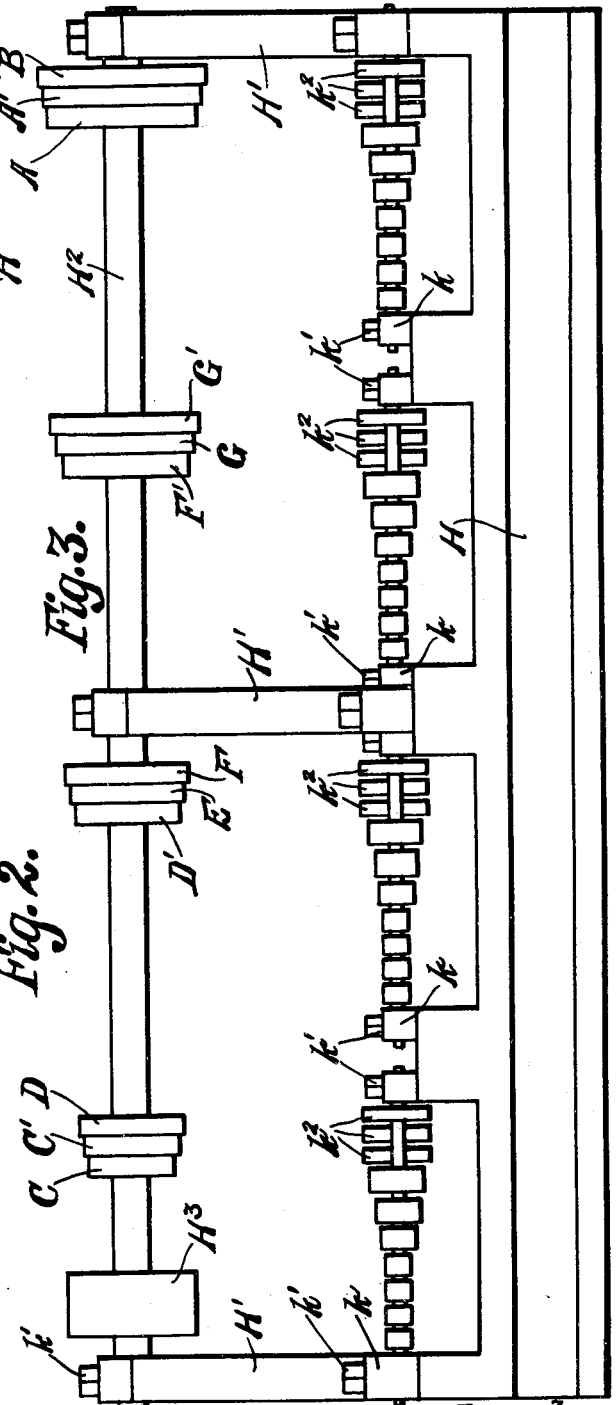

T. CAHILL.
MUSIC GENERATING AND MUSIC DISTRIBUTING APPARATUS.
APPLICATION FILED FEB. 10, 1902. RENEWED JAN. 10, 1914.
1,107,261.
Patented Aug. 18, 1914.
6 SHEETS—SHEET 3.
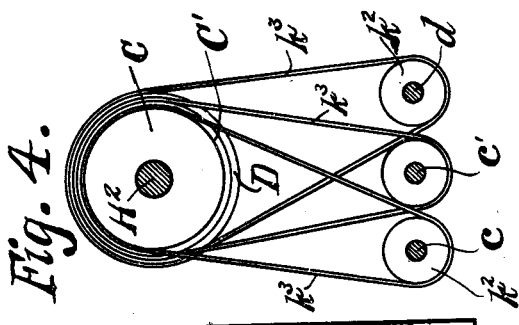
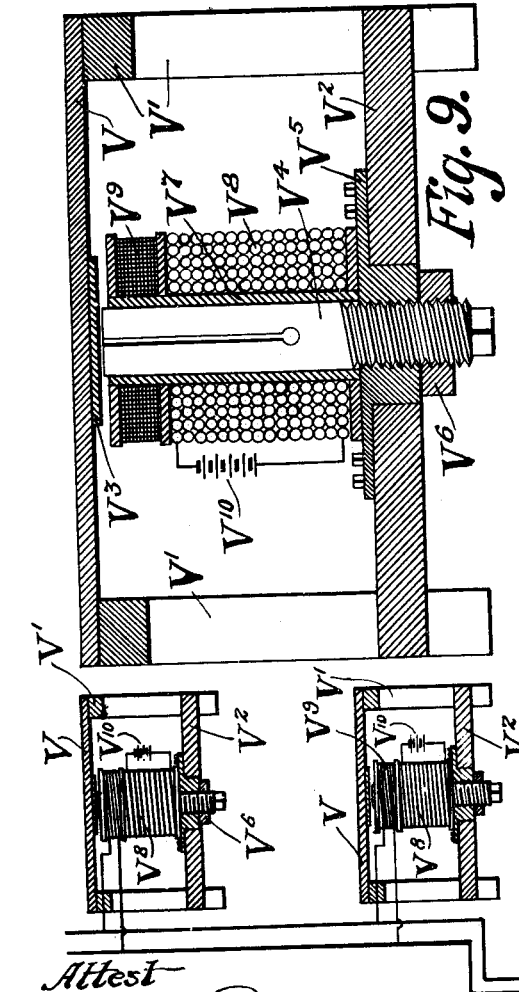
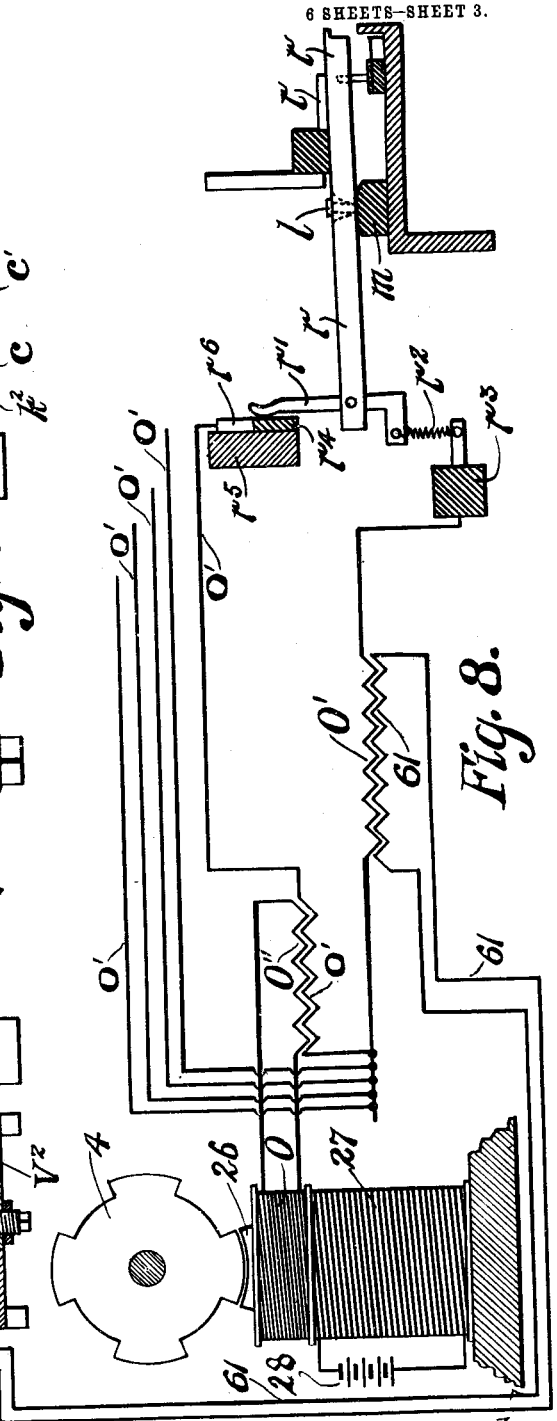
Attest
A. M. Poynton
Arthur T. Cahill.
Inventor;
Thaddeus Cahill

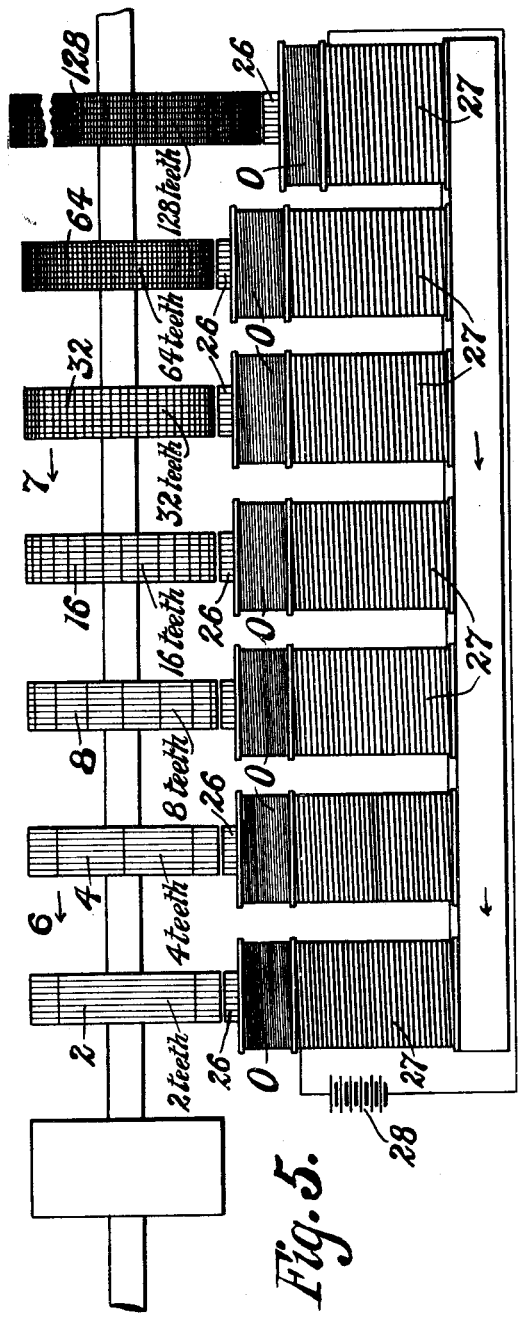
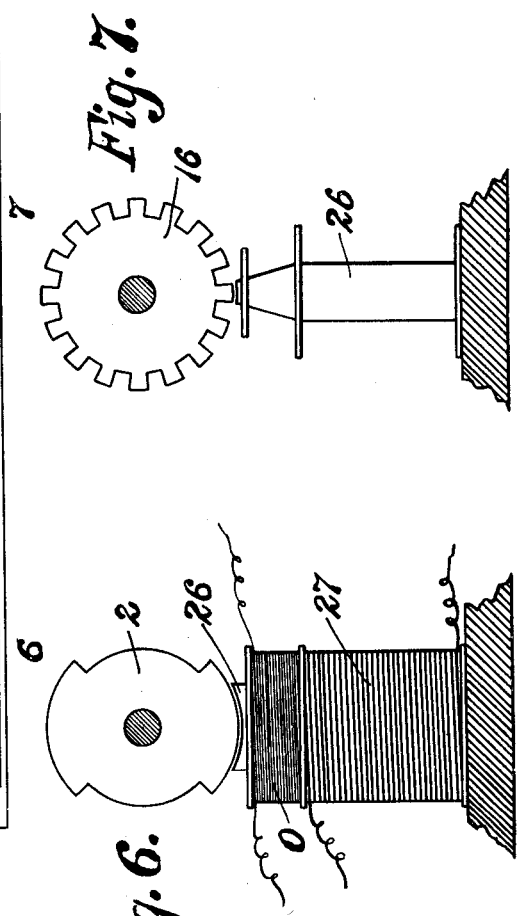

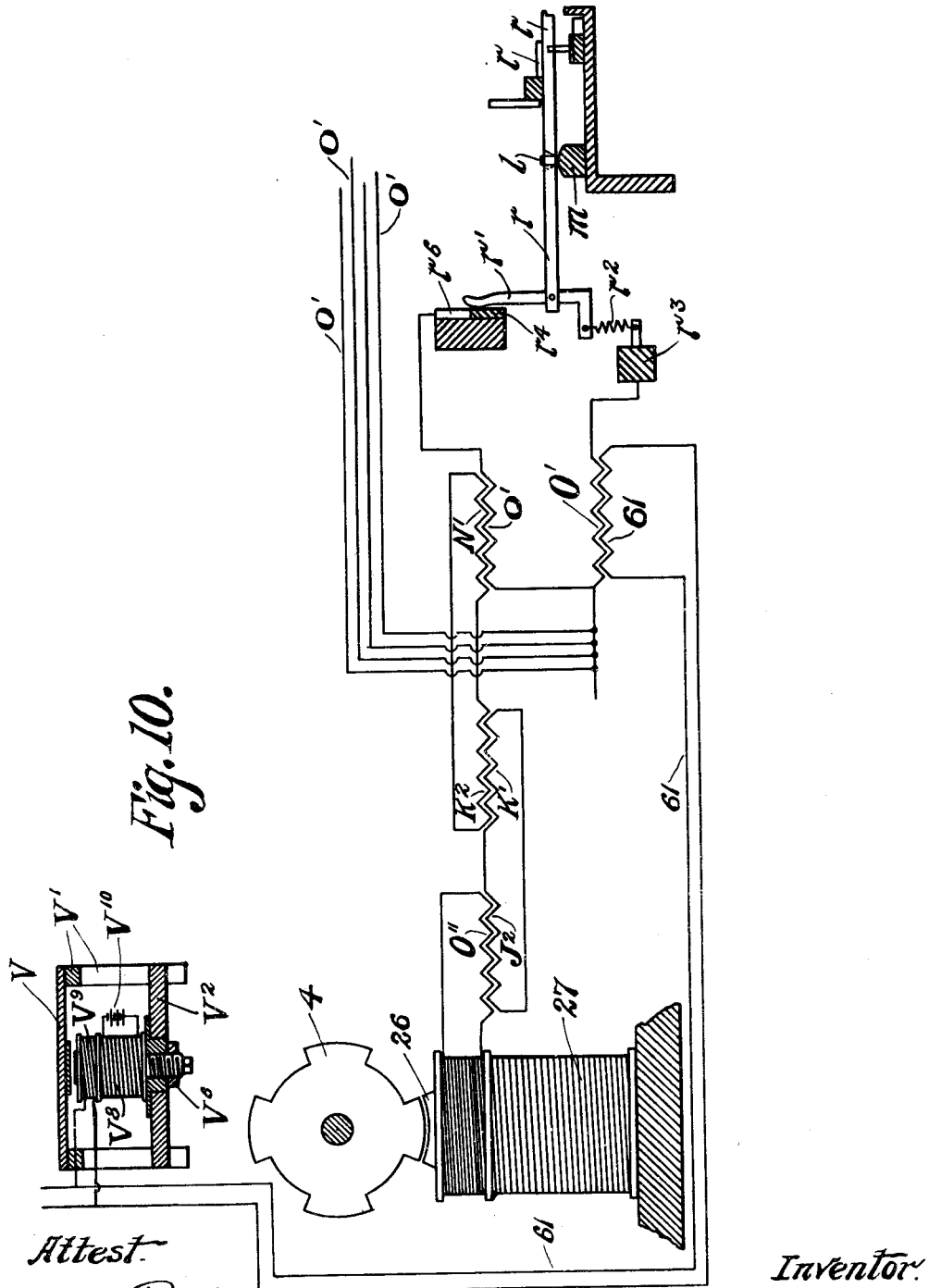

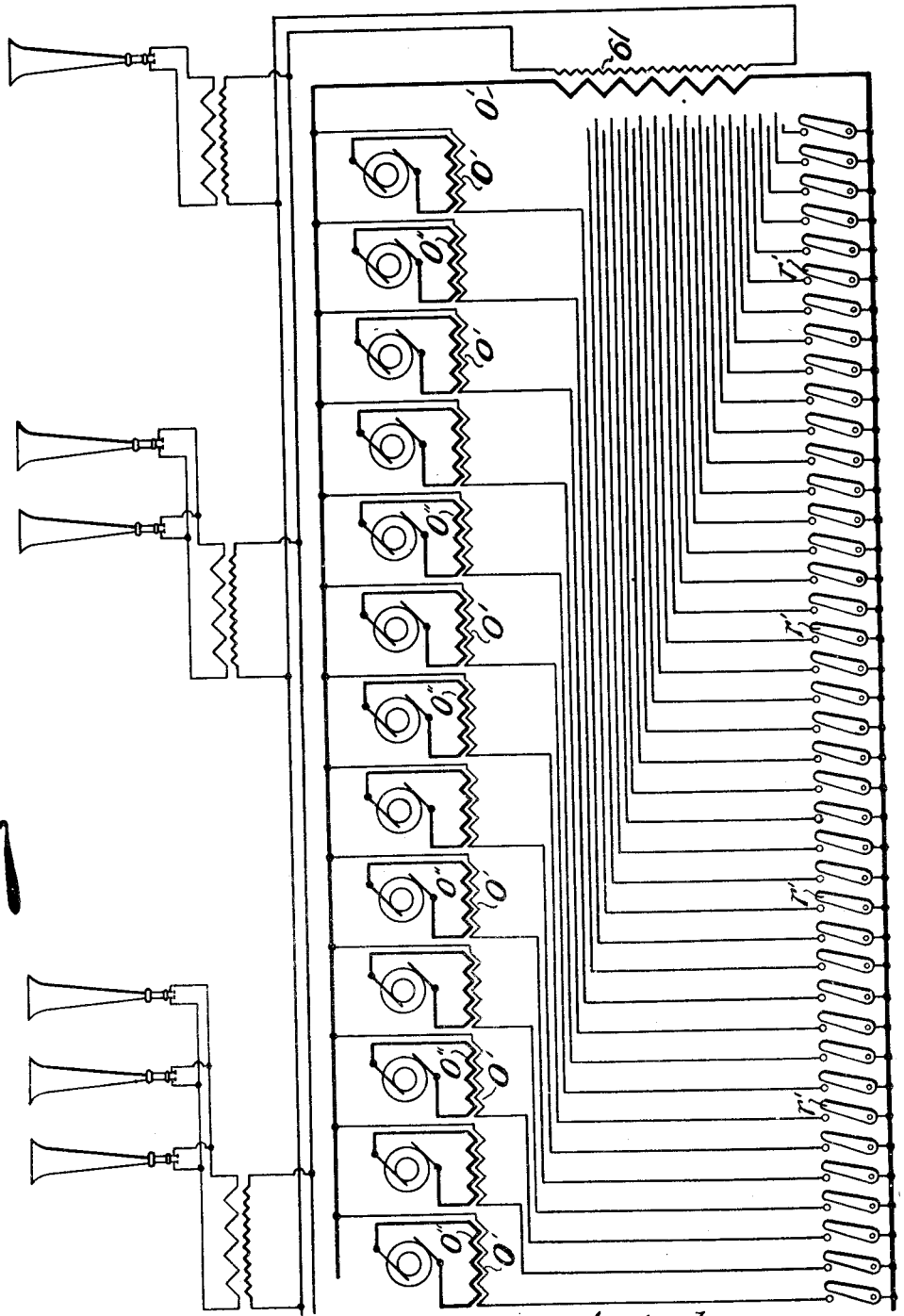

UNITED STATES PATENT OFFICE.

THADDEUS CAHILL OF WASHINGTON, DISTRICT OF COLUMBIA, ASSIGNOR TO ELLIS SPEAR, E. HILTON JACKSON, GEORGE F. CAHILL, ARTHUR T. CAHILL, AND THADDEUS CAHILL, TRUSTEES.

MUSIC-GENERATING AND MUSIC-DISTRIBUTING APPARATUS.

1,107,261.  Specification of Letters Patent.  Patented Aug. 18, 1914.

Original application filed August 10, 1895, Serial No. 558,939. Divided and this application filed February 10, 1902, Serial No. 93,433. Renewed January 10, 1914. Serial No. 811,497.

*To all whom it may concern:*

Be it known that I, THADDEUS CAHILL, a citizen of the United States, residing temporarily at Washington, in the District of Columbia, have invented a new and useful Apparatus for Generating Music and Also for Distributing Music, of which the following is a specification.

This application is one of several divisions (filed or in preparation for filing) of original application No. 558,939, filed August 10, 1895.

One object of my invention is to produce music electrically.

Another object of my invention is to distribute music electrically from one generating place or central station to many receiving points, so that many persons, each in his own home, can hear and enjoy the music produced by a performer at a central station.

Attempts have been made to distribute music heretofore, by (*a*) first producing, with the usual instruments of music, vibrations of the air; (*b*) translating these vibrations into electrical vibrations by means of microphones or other similar devices; and (*c*) transmitting these electrical vibrations from the central station to a plurality of places simultaneously and there translating the electrical vibrations into aerial vibrations by means of receiving telephones of the well known kind. The practical difficulty with this method of generating and distributing music electrically, lies in the fact that the aerial vibrations produced in the first instance, measured dynamically, are of little power and the electrical vibrations produced from them, by means of the microphones, are usually of much less power, so that the sounds produced by the receiving instruments are feeble—so feeble that ordinarily it is necessary to hold the receiving telephone to the ear to hear the music. And if a loud-sounding telephone apparatus be used with microphone transmitters, then the sounds produced are usually harsh. Another method of generating and distributing music electrically has been contrived, which consists in producing the requisite electrical vibrations at the central station, with the necessary power, by means of rheotomes. Such a method is described in the original application before mentioned, of which this is a division; also such a method is described in Letters Patent of the United States to me, No. 580,035, dated April 6, 1897, which issued upon an application which was a quasi-division of the original application before mentioned.

By my present system, I generate the requisite electrical vibrations at the central station by means of alternating-current dynamos, or alternators, as we may more briefly term them. Preferably, I employ as many alternators as there are notes in the scale, an alternator for each note. But I do not limit myself to having as many alternators as there are notes in the compass of the instrument. With these alternators, I produce musical electrical vibrations of enormous power, when compared with the electrical vibrations produced by microphones. By means of suitable note-controlling devices, preferably keys at a keyboard, I throw the vibrations of the different alternators upon the line, as the notes to which such alternators correspond are required in the playing of the musical composition that is being produced. With the line or distributing mains, I connect in any suitable manner one or more vibration-translating devices (preferably a plurality of such devices, located in different places) whereby electrical vibrations are translated into audible vibrations. I am thus enabled to produce music from one central station or place of distribution, simultaneously at many different places, with notes of good quality and great power. The musical electrical vibrations which I thus throw upon the line are millions of times more powerful, measured in watts, than those ordinarily thrown upon the line by a telephone or microphone of the kind commonly used, and by means of which musical electrical vibrations are copied electrically.

The accompanying drawings illustrate one simple form of apparatus for embodying my invention. I shall first describe this one form of apparatus, and when that has been clearly and fully explained, I shall point out certain modifications and alternative constructions, and will then, in the statement of claim at the end hereof, specifically point out and distinctly claim the parts, improvements and combinations which I claim, in this divisional application, as of my own invention or discovery.

In the accompanying drawings—Figure 1 is a diagrammatic view, illustrating one simple form of my apparatus; Fig. 2 is a diagrammatic plan view, illustrating twelve pitch shafts, corresponding to the twelve notes of the chromatic scale and each giving movement to a plurality of alternators having vibration-frequencies corresponding respectively to different powers of two, and serving to produce different octaves of the same note; Fig. 3 is a side elevation of the same, partly diagrammatic; Fig. 4 is a diagrammatic view, illustrating one arrangement of driving belts and pulleys for the pitch shafts; Fig. 5 is a detail view, a side elevation partly diagrammatic, illustrating one of the pitch shafts, with the alternating-current generators to which it gives movement; Fig. 6 is a side elevation, partly in section, on the line 6, 6, Fig. 5; Fig. 7 is a similar view, on the line 7, 7, Fig. 5, showing a laminated field magnet core with the field and armature windings removed; Fig. 8 is a view, partly in sectional elevation, partly diagrammatic, illustrating a key at the keyboard and the circuits controlled thereby; Fig. 9 is a sectional view, partly in elevations, are translated into audible vibrations; translating device, whereby electrical vibration, are translated into audible vibrations; Fig. 10 is a view similar to Fig. 8, but illustrating a modified construction, in which a plurality of inductive transfers are used to purify the tone. Fig. 11 shows a modification in which the line is connected with the receivers through transformers.

In all the figures, similar reference numerals refer to similar parts.

In the apparatus illustrated in the accompanying drawings, I employ a series of alternating-current dynamos, having vibration-frequencies corresponding to the notes of a musical scale, through a sufficient range, preferably a plurality of octaves. As the chromatic scale is, at present, in general use in piano-fortes and organs, I have illustrated my invention embodied in a mechanism for producing the notes of that scale, though of course, it may be adapted to produce the notes of any other scale.

*Of the pitch-shafts.*—In order to produce the notes of the chromatic scale electrically through a plurality of octaves, I have found it convenient to use as many shafts as there are notes in the chromatic scale within an octave (*i. e.* twelve) and to give movement from each shaft to a plurality of alternators, having vibration-frequencies corresponding to different octaves of the note for which such shaft stands. These different shafts I sometimes term, for convenience's sake, pitch shafts. Before describing these shafts, I shall describe the bed-plate, with the main driving-shaft and its supports. There is, then, a heavy cast iron bed-plate H. Castings or pillow-blocks, H', H', are firmly attached to this bed-plate and support journals in which the main driving shaft $H^2$ is mounted. This shaft may receive motion from any suitable driving engine, by means of a belt applied to the pulley $H^3$, or it may be driven in any other suitable manner whatever. The main driving shaft carries, besides the pulley $H^3$, twelve other pulleys, C, C', D, D', E, F, F', G, G', A, A', and B, which serve respectively to drive the twelve pitch-shafts. These shafts (marked respectively $c, c', d, d', e, f, f', g, g', a, a'$ and $b$) as shown in the drawings are, or at least may be, exactly alike. Each is mounted in boxes $k, k$, which are attached to the bed-plate, H, and held in place thereon by studs and nuts $k', k'$, and each carries a pulley $k^2$. Belts, $k^3, k^3$, omitted in most of the drawings but shown in Fig. 5, connect the pulleys $k^2, k^2$, belonging to the pitch shafts with the driving pulleys C, C', etc., carried by the main driving shaft $H^3$; the whole arrangement being such that the twelve pitch-shafts $c, c', d, d'$, etc., are connected respectively with the twelve driving pulleys C, C', D, D', etc., so that said pulleys C, C', D, D', E, F, F', G, G', A, A', and B, respectively drive the pitch shafts marked respectively $c, c', d, d', e, f, f', g, g', a, a'$ and $b$, respectively. The twelve pulleys, $k^2, k^2, k^2$, etc., belonging to the twelve pitch shafts respectively, are made preferably, all of exactly the same diameter and the twelve driving pulleys C, C', D, D', E, F, F', G, G', A, A' and B, are made to differ in diameter in the same proportions in which the vibration-frequencies of the twelve notes $c$, $c$-sharp, $d$, $d$-sharp, $e$, $f$, $f$-sharp, $g$, $g$-sharp, $a$, $a$-sharp, and $b$, differ from each other in equal temperament. Or the diameters of the different pulleys $k^2, k^2$, may be made to differ, as desired, the diameters of the corresponding driving pulleys C, C', D, D', etc., being made such that in the result said driving pulleys C, C', etc., give to the twelve pitch shafts, $c, c', d, d', e, f, f', g, g', a, a'$, and $b$, driven respectively by them, angular velocities proportional to the vibration-frequencies, in equal temperament, of the twelve notes of the chromatic scale ($c$, $c$-sharp, $d$, $d$-sharp, $e$, $f$, $f$-sharp, $g$, $g$-sharp, $a$, $a$-sharp and $b$) for which the twelve pitch shafts respectively stand. Making the twelve pulleys $k^2, k^2$, etc., attached, respectively, to the twelve pitch-shafts all of the same diameter, however, and making the differences in pitch by the different diameters given to the driving pulleys C, C', D, D', E, F, F', G, G', A, A', and B, the diameters of the twelve pulleys last mentioned expressed in units (for example, eighths of an inch) may be made as follows, to wit; diameter of pulley C, 258.7; of pulley C', 273.9; of pulley D, 290.3; of pulley D', 307.4; of pulley E, 325.9; of pulley F, 345.3; of pulley F', 365.8; of pulley D, 387.6; of pulley G', 410.4; cf pulley A, 435.0; of pulley A', 460.7; and of pulley B, 488.2. The pitch shafts should, of course, be well mounted and well lubricated, so that they will run with as little friction as may be, and the belts connecting the pitch-shaft pulleys $k^2$, $k^2$, etc., with the driving pulleys C, C', D, D', etc., should be drawn taut, so that the slip or at least the difference in the rate of slip of the belts aforesaid will be as nearly as possible negligible, for any material difference in the rate of slip of said belts would tend more or less to throw the instrument out of tune. And, finally, the main driving shaft $H^2$, which carries the pulleys C, C', D, D', etc., must be given such a velocity that it will bring the whole set of pitch shafts, with the alternators driven thereby, up to the pitch desired.

*The alternating - current generators, driven by the pitch-shafts.*—I have said that the pitch shafts may be made to be exactly alike and that I prefer to make each pitch shaft give movement to a plurality of alternating-current generators, having vibration-frequencies corresponding to different powers of two and serving to produce different octaves of the same note. In the drawings, I illustrate a very simple form of alternating-current generator of the variety known as an inductor alternator; but I do not, I wish it to be very distinctly understood, at all limit myself to that variety, for any form of alternator whatever that is suitable for the purpose may be used instead of that shown. With the simple form of alternator illustrated in the drawings, the field coil and the armature coil are both wound upon the same laminated mass, in the presence and field of which a toothed wheel, built up out of laminæ or plates of soft iron, revolves. The armature coil is, of course, wound upon the end of the field mass nearest to the rotating inductor. See particularly Figs. 5, 6 and 7, in which 26 is the field mass or core, built up of thin plates of soft iron, insulated from each other and suitably bound together and fastened in proper position on the bed plate. 27 is the field coil or exciting winding, through which a current is maintained by a battery or generator 28. O is the armature winding. 2, 4, 8, 16, 32, 64 and 128 are the inductors, firmly attached to the appropriate pitch shaft and having respectively 2, 4, 8, 16, 32, 64 and 128 teeth, and each of which produces as many complete or to-and-fro electrical vibrations per revolution as it has teeth. The result, then, is that the alternators impelled by a single shaft, have, as before said, vibration-frequencies corresponding to the different octaves of the same note.

$r$, $r$, are the keys of a key-board see particularly Figs. 8, 10 and 1. Preferably, these keys are arranged into a keyboard in the manner common and well known in pianofortes and organs, but, of course, any other suitable arrangement whatever may be used. With the details of construction, as illustrated in the drawings, the key $r$ is fulcrumed at $l$ on the bar $m$. Another or circuit-closing key $r'$ is operated by the finger-key $r$. I have spoken of the key $r$ as a finger-key. Obviously, it may be a pedal or foot-key quite as well as a finger key. In the original application, No. 558,939, filed August 10, 1895, before mentioned, of which this application is a division, and in my application No. 43,944, filed January 19, 1901, and in other pending applications of mine, such keys are shown both as pedal or foot keys and as finger keys. The circuit-closing key, or circuit-closer $r'$, is made of metal and is pivoted to the finger-key $r$, and has its horizontal limb connected by a conducting contractile spring $r^2$ with the metal bar $r^3$. With this bar one end of the primary coil $O'$ of the inductorium $O'$ 61 is connected, so that said bar $r^3$ serves as a common return for the circuits controlled by the several keys $r$, $r$. The armature-coil O of the alternator corresponding to any particular key $r$ is in circuit with another or primary coil $O^{11}$, which is in inductive relation to the secondary coil $o'$, one end of which is connected with the primary coil $O'$ of the inductorium $O'$ 61, while the other end of said coil $o'$ is connected with the conducting piece $r^6$. This conducting piece $r^6$ is suitably attached to the insulating bar $r^5$, just above the insulating strip $r^4$, which strip is also attached to the bar $r^5$. The circuit-closing keys $r'$, $r'$, (of which, it will be remembered, there is one for each of the keys of the key-board) lie normally in contact with the insulating strip $r^4$. But when the corresponding finger-key $r$ is depressed, the circuit-closing key $r'$ carried by said finger-key $r$, rises and makes contact with the conducting-piece $r^6$, thereby closing the circuit of the coil $o'$ corresponding to said key and which is fed with vibrations from the alternator corresponding to said key, through the intermedium of the circuit $O$ $O^{11}$. The result is, that the periodic variations in the intensity of the magnetization of the core 26, resulting from the uniform motion past it of the teeth of the inductor which rotates before it, producing alternating currents in the circuit $O$ $O^{11}$, act inductively upon the coil $o'$ to produce electrical vibrations therein, which, passing through the primary coil $O'$ act inductively upon the secondary or line-circuit, 61. A number of translating devices, whereby electrical vibrations are translated into audible aerial vibrations, are fed in any suitable manner with vibrations from the line circuit 61. One mode of doing this and the one illustrated in the drawings, Figs. 1 and 8, is to connect the vibration-translating devices in parallel with each other, so that each closes the circuit of the line 61.

Any suitable form of device whatever for translating the electrical vibrations, produced by the alternators in the line-circuit 61, into audible aerial vibrations, may be used. A good receiving telephone of the kind in common use, may be used, as illustrated in the drawings, Fig. 1. Or a vibration-translating device with a wooden sound-board and an electromagnet for its field-magnet, may be used, as illustrated in Fig. 8 and more in detail in Fig. 9, in which the sound-board is marked V. This sound-board is supported by a suitable framing V', attached to the base $V^2$. A soft iron armature $V^3$ is attached to the sound-board V. A soft iron core $V^4$, whose cross-section, in its upper portion, is that of a cleft cylinder (or it may be laminated in any other suitable manner whatever) attracts the armature $V^3$. A disk-shaped piece of soft iron $V^5$, having a threaded hole in its center, is screwed fast to the base $V^2$. The lower part of the core $V^4$ has a thread on it to fit the threaded hole in the center of the disk $V^5$. A lock-nut $V^6$ serves to hold the core in any position in which it may be adjusted with relation to the armature $V^3$. A bobbin $V^7$ surrounds the core $V^4$, and carries two coils of insulated wire, to wit, a field coil $V^8$ on its lower part, and an armature coil $V^9$ on its upper part surrounding that pole of the core $V^4$ from whence the lines of force pass to the armature $V^3$. The field coil $V^8$ is in circuit with a local battery $V^{10}$ and serves to maintain a field for the armature coil $V^9$ to work in. Said armature coil has one end connected with one of the line wires 61, and the other end connected with the other of said line wires, or with the ground, if a single-wire circuit with a ground return be used.

It is to be understood that each of the keys $r$, $r$, controls, or at least may control, a system of parts exactly like that illustrated in Fig. 8; the essential difference being that the alternators corresponding to the different keys have such different vibration-frequencies that each alternator gives electrical waves corresponding in frequency to the note for which its key stands. The different vibration-frequencies of the different alternators are produced preferably by employing, as before described, as many pitch shafts as there are notes within an octave, and giving movement from each pitch shaft to a plurality of alternators having vibration-frequencies, corresponding to different octaves of the note for which such pitch shaft stands. If a plurality of the keys $r$, $r$, be depressed simultaneously, the coils $o'$, $o'$, fed with vibrations from the alternating-current dynamos corresponding to said keys, will impress upon the circuit $O'$ electrical vibrations corresponding in wave-form to the aerial vibrations which produce the effect of the chord, for which the keys depressed stand, upon the ear. From the circuit $O'$ these electrical vibrations are transferred by induction to the line circuit 61, which includes the armature coils $V^9$, of the vibration-translating devices. These electrical vibrations, passing through these coils, produce periodic variations in the intensity of magnetization of the core $V^4$ and armature $V^3$, which result in vibrations of the sound-board or diaphragm V, and of the surrounding air, similar in general wave-form to the electrical vibrations produced by the alternators upon the line. Thus the music produced by a performer, playing at a central station, may be heard by many persons, each in his own home—may be heard wherever the vibration-translating devices are located. By the apparatus illustrated in the drawings, a tune may be played at many places simultaneously, with notes of good quality and great power.

The apparatus which I have hereinbefore described has been described merely as one out of many possible embodiments of my invention. I shall now point out a few of the many modifications which may be made without departing from the essential principles, or at least without departing from certain of the essential principles, of my invention.

It will be observed that in the drawings (see particularly Figs. 1 and 8) the circuit which is made and broken by the action of the key $r$, is not the armature circuit O, but a circuit in inductive relation thereto. The merit of this construction is that the vibrations produced in the coil $o'$ are more nearly sinusoidal than those produced in the armature coil O. For the vibrations of the electrical current produced in the armature coil O, are rendered by the self-induction of the circuit containing that coil more nearly sinusoidal than the vibrations of voltage impressed upon that circuit. This results from the fact that the impedance of a coil, when that impedance is large, tends to suppress the higher partials to a very much greater extent than the ground tone. The same process goes on in the circuit of the coil $o'$, the higher partials being suppressed to a much greater extent than the ground tone. The result is a certain amount of purification of the tone. The accompanying disadvantage is that the tone is weakened by the same process of inductive transfer by which it is purified. Instead of having only one inductive transfer between the armature coil O and the coil $o'$, whose circuit is made and broken by the key, we may have several inductive transfers, as illustrated, for example, in Fig. 10. Or, on the other hand, we may omit the coil o' entirely, and connect one terminal of the armature coil O to the primary coil O', and the other end to the contact-piece $r^6$, controlled by the key with which the alternator corresponds—a construction which, while it is covered generically by many of the claims at the end hereof, in the sense that it would be an infringement of those claims, is not specifically claimed herein, and could not be specifically claimed herein, under the rules of practice. But the construction mentioned, in which the armature circuit is made and broken by the key $r$, with related subject matter is illustrated and described in another pending application of mine, No. 145,197, in which it is covered by specific claims.

*Of the vibration-translating devices.*— As before stated, my vibration-translating devices, illustrated in the drawings, are essentially receiving telephones. This fact should be clearly understood. And when it is understood, it will be understood also that any other form of receiving telephone might be used with greater or less effect as a receiving or translating device in the carrying out of my invention. A great many different kinds of receiving telephones, or telephone receivers, are well known. In the type commonly used, the electrical vibrations are translated into aerial vibrations by means of a magnet wound on one or both of its poles with insulated wire, and acting upon a soft iron diaphragm, attracting the diaphragm with varying force, as the currents vary in the wire surrounding its pole or poles. This is likewise the essential construction of the device illustrated in Fig. 9; but for the sake of producing more powerful effects, I employ, in Fig. 9 a wooden sound-board, instead of the soft iron diaphragm, and a strong electro-magnet for the field, in place of the steel magnet usually employed. But many receiving instruments are known which dispense some with the coil and magnet, others with the iron diaphragm or equivalent armature and sound-board; others with all these parts. In the well known condenser receiving-telephone of Prof. Dolbear, for example, no magnet and no coil is used in the receiver, but two diaphragms, insulated from each other and connected one with the line and the other with the ground or with the return wire, alternately attract and repel one another as changes of potential vibrate upon the line. In other forms of receiving telephone, the expansion and contraction of a fine wire, as its temperature changes with the currents that vibrate through it, have been employed to translate electrical vibrations into aerial vibrations. In other receivers, the molecular changes in a metal core resulting from the vibrations of a current passing around it, are employed to translate electrical vibrations into aerial vibrations. In the chemical telephone of Mr. Edison, the changes produced by a vibratory current acting upon a chemical solution which conducts the current between moving surfaces is employed to translate electrical vibrations into aerial vibrations. And in a peculiar form of receiver invented by Prof. Gray, changes in the coefficient of friction between animal tissue and a metal surface, produced by the passage of a vibratory current between them, are availed of to translate electrical vibrations into sound. These different devices are referred to only as prominent and well known examples of receiving telephones constructed upon different principles. In fact, not only the mechanical devices, but also the scientific principles by which electrical vibrations are translated into sound are very various. And it will, I think, be found that whatever device or arrangement of parts will serve as a receiving electric telephone, would serve also, to some extent at least, as a translating device in the carrying out of my present invention. The function of my translating device, to translate musical electrical vibrations into audible aerial vibrations, is much simpler indeed, than that of the receiving telephones employed in the transmission of speech, which have to traslate the very complex vibrations of speech. The translating devices used in the carrying out of my invention, should, however, produce powerful tones; and for that reason the arrangement of a magnet wound with a coil and attracting some form of diaphragm or sound-board is, in my opinion, probably the most practical arrangement. But however this may be, it should be borne in mind, (a) that while some translating device is necessary in the carrying out of my invention, and while a translating device forms an essential element of some of the combinations hereinafter claimed, yet what I have invented is not the translating device, but rather and *inter alia*, the method of and apparatus for generating and distributing music electrically; (b) that many forms of translating devices are well known in the art under the name of receiving telephones or telephone receivers; and (c) that any translating device whatever, that is suitable for the purpose, may be used in the carrying out of my invention.

Instead of arranging the vibration-translating devices in parallel circuits, as illustrated in Figs. 1, 8 and 10, they may be arranged in series or in any other suitable manner.

A continuous metallic line circuit is illustrated in the drawings, but in many situations a single wire, with a ground return, may be used, a construction which has the advantage of cheapness. The continuous metallic circuit costs more money, but has the great advantage of being freer from disturbing currents.

Instead of connecting the line wire with the translating devices by conduction, as illustrated in Figs. 1, 8 and 10, it may be connected with the translating devices by induction; the line wire, for example, being connected with the primary coils of suitable inductoriums or transformers (the different transformers being arranged either in series or parallel) and the secondaries of the transformers being connected with the translating device, or the translating devices, for which such transformer serves. By this means small wires may be used to transmit powerful tones, or rather the electrical vibrations corresponding thereto, long distances; one illustration of such a connection is given in Fig. 11.

*In regard to cores.*—I consider it best, for economy's sake, to use iron cores, well annealed and finely laminated, for the tone-purifying inductoriums for pitches below middle $c$. And they may be used for pitches higher in the scale. By the term tone-purifying inductoriums, I mean inductoriums that serve to purify the quality of the tone by assimilating the vibrations to sine-waves, by suppressing or eliminating or excluding the higher components of the tone to a greater extent than the ground tone. In Figs. 1 and 8 the inductoriums $O''$. $o'$, are tone-purifying inductoriums. In Fig. 10, the inductoriums $O''$ $J^2$, and $K'$ $K^2$, and $N'$ $o'$ are tone-purifying inductoriums, for they serve to assimilate the electrical waves transmitted inductively by them to sine-waves. I consider it best to omit the iron cores from the tone-purifying inductoriums for the higher notes. I consider it preferable, in some respects also to avoid iron cores in the inductoriums $O'$ 61, in which the vibrations are combined into one ensemble, obtaining the necessary mutual induction between the coils $O'$ and 61 by using a sufficient number of turns of wire in the coils. I have found that inductoriums in which iron cores are not used are, in important respects, especially for the wave-combining inductorium $O'$ 61, superior to those in which iron cores are used. A good musical effect can be obtained, however, either with or without iron cores. But wherever iron cores are used for the inductoriums illustrated in the drawings, I have found it preferable that the magnetic circuit should be an open iron circuit, and that the reluctance, or magnetic resistance, of the air or non-ferric part of the circuit should contain the major part of the whole reluctance of the circuit.

For some purposes, and particularly in the middle and higher part of the compass, I consider a device in which there is but one inductive transfer for purifying the tones, as in Figs. 1 and 8, or the modification hereinbefore mentioned, in which the coil $O''$ is omitted and the armature coil O has one terminal connected with the wire $O'$ and the other with the key-controlled contact-piece $r^6$, preferable to the device illustrated in Fig. 10, for there is much less loss of power in the former than in the latter case.

In the drawings of this application I have illustrated a single form of mechanism for carrying out my invention. In particular, the drawings show an apparatus having but one keyboard and one set of tone-producing devices. In the original application before mentioned, of which this is a division, as well as in my co-pending application, No. 43,944, filed January 19, 1901, and in other pending applications of mine are illustrated more complicated and expensive devices having a plurality of keyboards, having more than one set of tone-producing devices or tone-producing coils, and having numerous expression devices of various sorts. Any person desiring to build an apparatus having a plurality of keyboards, or having a plurality of sets of tone-producing coils, or having expression devices, will find the necessary information in the original application, of which this is a division, and in the other pending applications before mentioned, particularly the application filed January 19, 1901, Serial No. 43,944. Each of the applications above mentioned with the Letters Patent before mentioned, No. 580,035, dated April 6, 1897, illustrates a different portion of my work, and all should be consulted to get a perfect idea of the whole of my work in this field.

Apart from the broad principle of producing music by means of alternating-current dynamos, and distributing music by means of alternating-current dynamos, neither of which, so far as I am aware, has ever been either accomplished or suggested before my invention, the following important features of construction, which are also, as far as I am aware, new with me, may be mentioned:

(a) *Driving different alternators, corresponding to different notes, with different angular velocities.*—If we attempt to use one angular velocity for all the alternators, it becomes difficult to obtain the vibration-frequencies requisite for the different notes of the scale, particularly for the notes of the chromatic scale, without making the alternators of enormous and, indeed, impracticable size. But by driving different alternators with different angular velocities, we readily obtain all the notes of the chromatic, or any other, scale desired, with practically perfect pitches. I prefer, as before said, to use a different pitch shaft for each different note within the compass of an octave, but so far as the broad principle of driving different alternators with different angular velocities is concerned, it is not necessary to use as many pitch shafts as there are notes in the compass of an octave. Nor do I limit myself to using as many shafts as there are notes in the compass of an octave, except in those paragraphs of claim at the end hereof in which such limitation is by some form of words clearly expressed.

(b) *Using an organization of alternators having vibration-frequencies corresponding to musical notes of different pitches; different alternators being constructed so that they produce different numbers of electrical vibrations per revolution, and combining with these alternators driving mechanism whereby different alternators are driven with different angular velocities.*—Thus, to obtain the requisite vibration-frequencies of the different notes, I use the two factors, (a) of the number of electrical vibrations produced per revolution by the alternator; and (b) the angular velocity of the alternator, and by changing one or both of these factors any desired vibration-frequency can readily be secured.

(c) An important particular case under the foregoing principle or broad combination, is the use of alternators for producing electrical vibrations corresponding to musical notes arranged in a plurality of groups, the rotating members of each group being connected with the other rotating members of that group, so that they rotate with the same angular velocity; different alternators of such a group being formed to produce different numbers of electrical vibrations per revolution; and the different groups of alternators having different angular velocities. By this means, a few different angular velocities and a few different patterns of alternators, repeated in each group, may be made to give a great number of notes. One illustration of this principle, in which all the octaves of a note constitute a group, and the different notes within the compass of an octave, (each note repeated in its different octaves) constitute the different groups, is found in the mechanism illustrated in the drawings of this application. The illustration furnished by the drawings, however, is only one out of several possible applications of this principle of my invention.

(d) An important particular case under each of the above principles, set forth in paragraphs (a), (b) and (c) is the construction above mentioned, in which as many pitch shafts are used as the notes of the scale within the compass of an octave, these shafts being driven with different angular velocities, and each serving to give movement to a plurality of alternators, constructed to have vibration-frequencies standing to each other as different powers of two, and serving to give different octaves of the same note. The particular illustration of this principle found in the drawings embodies twelve shafts, corresponding to the twelve notes of the chromatic scale; but the principle applies whether the chromatic scale be used or some other scale.

(e) Another important particular case under the above heads, and of which one illustration is to be found in the drawings, consists in rotating the shafts which correspond to different notes with angular velocities having the same numerical ratios as the vibration-frequencies of the notes to which they respectively correspond. From this construction two advantages result: (a) perfect pitches may be obtained; and (b) one pattern of alternator may be made, (and in the construction illustrated in the drawings is made) to serve for all the notes of the scale within the compass of an octave, the consecutive notes within that compass being obtained from alternators of the very same pattern by the different speeds with which they are driven. Thus all the notes of the scale through seven octaves can be obtained from seven patterns of alternators, each pattern repeated twelve times. This results in a great simplification of the work of construction, and a cheapening of the tools required.

Yet other important features of my invention relate to the combination, with a suitable organization of alternators, of suitable vibration-translating apparatus, and suitable means whereby the different alternators are caused to sound their respective notes, each as required, in the vibration-translating apparatus. The form of vibration-translating device which I prefer to use, and the one illustrated in the drawings, is a common-receiver vibration-translating device. By a common-receiver vibration-translating device, I mean a device that translates musical notes of different pitches into audible vibrations. I use the term common-receiver in the contradistinction to those tuned receivers that are capable each of translating into audible vibrations electrical vibrations of one given frequency only. But though I prefer to use common-receiver vibration-translating devices, I do not at all limit myself to using common-receiver vibration-translating devices except in those paragraphs of claim in which such limitation is clearly and expressly stated; for other kinds of vibration-translating devices may, in some instances at least, be used instead.

The arrangement of note-controlling devices which I consider on the whole the most useful, and the one which is illustrated in the drawings, is a collection of keys formed into a keyboard. But other note-controlling devices are well known in the musical art, and I do not limit myself to keys of a keyboard as note-controlling devices, except in those particular paragraphs of claim where such a limitation is clearly expressed.

In the drawings I have illustrated an arrangement of alternators in which there are as many pitch shafts as there are notes of a scale within the compass of an octave, and I have illustrated an arrangement of pulleys and belts for driving the different pitch shafts with angular velocities corresponding respectively to the vibration-frequencies of the notes for which such pitch shafts stand. But—

(a) Though I consider it important in many cases and for many purposes to employ as many pitch shafts as there are notes within the compass of an octave (counting the note on which the octave commences and ends as one, making twelve pitch shafts for the chromatic scale or seven for the diatonic scale,) a pitch shaft for each note, and to run these shafts with different angular velocities, yet, since I am the first person, so far as I am aware, who has ever produced and distributed music from dynamos by any construction or arrangement of mechanism whatever, I wish broad protection for my invention, and do not intend to limit myself to using as many pitch shafts as there are notes in the compass of an octave, (nor, indeed, to using any pitch-shafts) except in those paragraphs of claim at the end hereof in which such limitation is clearly expressed or necessarily implied.

(b) I do not attach any special importance to the use of pulleys and belts as the driving mechanism for driving the several pitch shafts, each with the requisite angular velocity, as illustrated in the drawings. The construction illustrated in the drawings was the best form of mechanism that I had contrived for the purpose at the date of the filing of the original application before mentioned, No. 558,939, of which this application is a division, and was the only arrangement for the purpose illustrated in the drawings of that application, and it is, therefore, the only one which, under the settled rules of practice, can be illustrated in this divisional application. But in my other pending application before mentioned, No. 43,944, filed January 19, 1901, an arrangement of parts is clearly illustrated and fully described and claimed in which my present principles of (i) employing as many pitch shafts as there are notes within the compass of an octave; (ii) mounting on each pitch shaft the rotating members of alternators having vibration-frequencies standing to each other as different powers of two, and serving to give different octaves of the note for which such pitch shaft stands; and (iii) driving the different pitch shafts with different angular velocities—are employed in combination with an improved driving mechanism especially adapted to the purpose, whereby the several pitch shafts are all of them positively connected to run, each at exactly the appropriate angular velocity and absolutely without slip. I do not therefore, it will be understood, limit myself to using the form of driving mechanism illustrated in the drawings, but reserve the right to use any other form whatever by which the several features of my invention set forth in the statement of claim at the end hereof may be carried out.

(c) So far as the broad feature of my invention of generating and distributing music electrically by means of alternators, and which so far as I am aware was never as before said done prior to my invention, and so far as the broad combination claims for such an organization of alternators is concerned, I do not limit myself either (a) to a construction in which as many pitch shafts are employed as there are notes of the scale within the compass of an octave (twelve for the chromatic scale or seven for the diatonic scale) nor (b) to a construction in which a plurality of pitch shafts are employed, running at different angular velocities, and each giving a movement to a different portion of the shafts, except in those paragraphs of the statement of claim at the end hereof in which such a limitation is in some form of words clearly expressed. And while I consider it convenient and in many ways advantageous to rotate the different pitch shafts, where a plurality of them are employed, with angular velocities having the same numerical ratios as the vibration-frequencies of the notes of the scale to which said shafts respectively correspond, it is not necessary that this should be done in every case in order to carry out the broad principle of my invention of rotating different shafts with different angular velocities.

I have shown in the drawings a particular construction of inductor alternator which has the merit of simplicity and cheapness, and of non-liability to get out of order as there are no moving wires and no moving connections. But any other suitable form of alternator whatever that is suitable for the purpose may be used instead. It will be understood, then, that in the statement of claim at the end hereof, I use the words "alternator," or "alternating-current dynamo," whether in the singular or in the plural, in its broad and generic sense, and do not restrict myself to inductor alternators except in those few paragraphs of claim in which such limitation is clearly and expressly set forth.

Instead of arranging the coils $o'$, $o'$, in parallel circuit, with the primary coil $O'$ as a common return, they may be arranged in any other suitable manner whatever. Thus, for example, to mention one out of several possible modifications, I may use a vibration-combining inductorium having separate primaries for the several coils $o'$, $o'$, (a primary for each of said coils $o'$, said primaries being each connected in series with its coil $o'$) and from the secondary of said inductorium I can convey vibrations in any suitable manner whatever to the vibration-translating devices. Such a construction is described in the original application before mentioned, of which this is a division. And in general I would say that many modifications of the broad features of invention embodied in the mechanism and apparatus illustrated and described in the drawings of this application are illustrated and described in other pending applications of mine, and particularly in the original application before-mentioned, No. 558,939; that I have made yet other modifications; that many such modifications may be made by the skilled electrician, whether involving invention or not involving invention, without at all departing from the essential and underlying, or at least from certain of the essential and underlying principles of my invention herein described, and that I wish full protection for all my invention herein described and for every part thereof.

By the terms alternating current dynamo, or alternating current generators or alternators (all which are used herein synonymously) as the same are used in this specification, and particularly in the statement of claim at the end hereof, I mean any suitable sort or kind of alternating current dynamo whatever—any sort or kind of device whatever in which alternating currents are generated inductively by the rotation of an inductive body in the presence of a field, or of a field in the presence of an inductive body, or of each in the presence of the other; and I do not at all limit myself to the particular kind or construction of alternator illustrated in the drawings, which is shown only by way of example and not by way of limitation.

By circuit-controlling device I mean any device whatever for controlling a circuit, and I do not limit myself to the particular kind illustrated in the drawings, but mean to include every other kind which may be used instead.

By note-controlling device I mean a device which acts to cause the production of a note in the vibration-translating apparatus, and by note-controlling devices I refer to any suitable sort or kind of device or mechanism whatever whereby the notes of an air, tune or musical composition may be caused to sound, each as required.

By the term vibration-translating device, as used in the statement of claim at the end hereof, I mean to include any device whatever for causing the production of audible vibrations by means of electrical vibrations.

When, in any of the paragraphs of claim at the end hereof, I speak of one circuit acting inductively upon another circuit, or being in inductive relation to another circuit, or use other words of similar import, I do not mean to imply that the one circuit which is in inductive relation to the other circuit, or which acts inductively upon the other circuit is necessarily itself in the field of that other circuit; I only mean that the first circuit, in some suitable manner, whether directly or through the intermedium of one or more other inductively intermediate circuits, causes by induction an electrical effect in the other circuit when the strength or direction of the currents circulating in the first circuit is altered. Thus, in the drawings, the armature circuits, $O\ O''$, $O\ O''$, are, in the sense in which I use the words in this specification, in inductive relation to the line circuit 61, and act by induction upon said circuit 61, although the armature circuits $O\ O''$, $O\ O''$, are not in the field of the line circuit 61, and can act on that circuit only through the inductively-intermediate circuits $o'\ O'$, $o'\ O'$. So when I speak generically of vibration-translating apparatus, or more specifically of common-receiver vibration-translating devices, being fed with vibrations from the line, or from some other circuit, I do not mean that such vibration-translating apparatus shall necessarily be connected directly with the line or source from which it is fed with vibrations, though, of course, it may, as in the drawings, be connected conveniently with the line. By saying, in effect or in substance, that the vibration-translating apparatus is fed with electrical vibrations from the line, I mean only that the electrical vibrations in the line cause, in some manner and by some suitable means, electrical vibrations in the vibration-translating apparatus, which are by that apparatus translated into audible sound, and I have already pointed out that the line circuit 61 may act upon the vibration-translating devices through one or more circuits that shall be inductively intermediate said line and said vibration-translating devices.

As before stated, I am the first person, so far as I am aware, to produce music by means of dynamos, and the first to ever distribute music by means of dynamos. I wish full and just protection for every part of my invention; I wish the full benefit of the doctrine of equivalents, and I do not intend to dedicate or abandon any part of my invention to the public, nor to limit any of the paragraphs of claim at the end hereof except as each may be limited by the clauses of limitation clearly expressed in it.

I do not claim in this application anything that is claimed in my other prior applications—No. 43,944, filed June 19, 1901, renewed February 26, 1913, No. 750,721; No. 145,197, filed February 26, 1903, renewed on or about November 6, 1913, renewal No. 799,625; No. 194,111, filed February 17, 1904; No. 194,112, filed February 17, 1904; No. 194,113, filed February 17, 1904; No. 194,114, filed February 17, 1904; No. 194,116, filed February 17, 1904; No. 194,117, filed February 17, 1904, renewed, April 27, 1914, renewal No. 834,817; No. 436,013, filed June 1, 1908; No. 485,645, filed March 25, 1909; and No. 513,961, filed August 21, 1909. But

What I claim herein, and desire to secure by Letters Patent hereunder is—

1. In combination, in an electrical music-generating system, a series of alternators having vibration-frequencies corresponding to consecutive notes of a musical scale.

2. In combination, in an electrical music-generating system, a series of alternators having vibration-frequencies corresponding to consecutive notes of the chromatic scale.

3. In combination, in an electrical music-generating system, a series of alternators having vibration-frequencies corresponding to consecutive notes of a musical scale, through one or more octaves.

4. In combination, in an electrical music-generating system, a series of alternators having vibration-frequencies corresponding to consecutive notes of the chromatic scale, through one or more octaves.

5. In combination, in an electrical music-generating system, (a) a plurality of alternators having vibration-frequencies corresponding to musical notes of different pitches; and (b) driving mechanism for said alternators, whereby different alternators are driven with different angular velocities.

6. In combination, (a) a series of alternators having vibration-frequencies corresponding respectively to consecutive notes of a musical scale through one or more octaves; and (b) driving mechanism for said alternators, whereby different alternators are driven with different angular velocities.

7. In combination, in an electrical music-generating system, (a) an organization of alternators having vibration-frequencies corresponding to musical notes of different pitches, different alternators being constructed so that they produce respectively different numbers of electrical vibrations per revolution; and (b) driving mechanism for said alternators, whereby different alternators are driven with different angular velocities.

8. In combination, (a) a plurality of alternators having vibration-frequencies corresponding to consecutive notes of a musical scale through one or more octaves; different alternators being constructed so that they produce, respectively, different numbers of electrical vibration, per revolution; and (b) driving mechanism for said alternators, whereby different alternators are driven with different angular velocities.

9. In combination, in an electrical music-generating system, alternators for producing electrical vibrations corresponding to musical notes of different pitches; said alternators having rotating members; said alternators being arranged in a plurality of groups; the rotating members of a group of alternators being connected together so that they rotate with the same angular velocity; different alternators of such a group being constructed to produce different numbers of electrical vibrations per revolution; different groups of alternators being driven with different angular velocities.

10. An organization of alternators having vibration-frequencies corresponding to the notes of a musical scale through a plurality of octaves; said alternators having rotating members; said alternators being arranged in a plurality of groups; the rotating members of a group of alternators being connected together so that they rotate with the same angular velocity; different alternators of such a group being constructed to produce different numbers of electrical vibrations per revolution; different groups of alternators being driven with different angular velocities.

11. In combination, in an electrical music-generating system, (a) a plurality of shafts; (b) means whereby said shafts are driven with different angular velocities; and (c) alternators receiving movement from said shafts and serving to produce electrical vibrations having frequencies corresponding to the notes of a musical scale.

12. In combination, in an electrical music-generating system, (a) shafts equal in number to the notes of a musical scale within the compass of an octave, said shafts rotating with different angular velocities; and (b) alternators receiving movement from said shafts and serving to produce electrical vibrations having frequencies corresponding to the notes of a musical scale.

13. In combination, in an electrical music-generating system, (a) twelve shafts rotating with different angular velocities; and (b) a series of alternators receiving movement from said shafts and serving to produce electrical vibrations having frequencies corresponding to the notes of the chromatic scale.

14. In combination, in an electrical music-generating system, (a) a plurality of shafts corresponding respectively to consecutive notes of a musical scale, and rotating respectively, with angular velocities having the same numerical ratios as the vibration-frequencies of the notes to which they respectively correspond; (b) alternators receiving movement from said shafts and serving to produce electrical vibrations having frequencies corresponding to the notes of the scale to which such shafts respectively correspond.

15. In combination, in an electric music-generating system, (a) shafts, equal in number to the notes of a musical scale within the compass of an octave, said shafts corresponding, each to a different one of said notes, and rotating with angular velocities having the same numerical ratios as the vibration-frequencies of the notes to which they respectively correspond; and (b) alternators receiving movement from said shafts and serving to produce electrical vibrations having frequencies corresponding to the notes of the scale to which such shafts respectively correspond.

16. In combination, in an electrical music-generating system, (a) twelve shafts corresponding respectively to the twelve notes of the chromatic scale and rotating with angular velocities having the same numerical ratios as the vibration-frequencies of the notes to which they respectively correspond; and (b) alternators receiving movement from said shafts and operating to produce electrical vibrations having frequencies corresponding to the notes of the chromatic scale.

17. In combination, in an electrical music-generating apparatus, a shaft, and a plurality of alternators carried by said shaft and having vibration-frequencies standing to each other as different powers of two, and serving to produce electrical vibrations having frequencies corresponding to different octaves of the same musical note.

18. An electrical music-generating system, including, in combination, (a) a plurality of shafts; (b) alternators, whose rotary members are carried by the shafts aforesaid, each of a plurality of said shafts carrying the rotary members of a plurality of the alternators aforesaid, whose vibration frequencies stand to each other numerically as powers of two.

19. In combination, in an electrical music-generating system, (a) a plurality of alternators for producing electrical vibrations corresponding to consecutive notes of a musical scale; and (b) a plurality of shafts, each giving movement to a plurality of said alternators having vibration-frequencies standing to each other numerically as powers of two.

20. In combination, in an electrical music-generating system, an organization of vibration-generating devices for producing electrical vibrations corresponding to the notes of a musical scale through a range greater than one octave; said organization including (a) a plurality of alternators; and (b) shafts equal in number to the notes of the musical scale aforesaid within the compass of an octave; said shafts each in general giving movement to a plurality of alternators whose vibration-frequencies correspond to different octaves of the same note; the alternators carried by different shafts having vibration-frequencies corresponding to different notes.

21. In combination in an electrical music-generating system, an organization of vibration-generating devices for producing electrical vibrations corresponding to notes of a musical scale through a range greater than one octave, said organization including (a) a plurality of alternators; and (b) twelve shafts corresponding respectively to the twelve notes of the chromatic scale, in that they give movement to the alternators whose vibration-frequencies correspond with those of the twelve notes of the chromatic scale, each of a plurality of said shafts giving movement to a plurality of alternators whose vibration-frequencies correspond to different octaves of that note of the chromatic scale to which the shaft carrying such alternators corresponds.

22. An electrical music-generating system, including, in combination, (a) a plurality of shafts; (b) alternators, whose rotary members are carried by the shafts aforesaid, each of a plurality of said shafts carrying the rotary members of a plurality of the alternators aforesaid, whose vibration frequencies stand to each other numerically as powers of two, the necessary differences in the vibration-frequencies of the alternators aforesaid being obtained partly by furnishing different numbers of poles to different alternators, and partly by giving different angular velocities to the various shafts aforesaid.

23. In combination, in an electrical music-generating system, (a) a plurality of alternators for producing electric vibrations corresponding to consecutive notes of a musical scale; (b) a plurality of shafts rotating with different angular velocities, and each giving movement to a plurality of the alternators aforesaid having vibration-frequencies standing to each other numerically as different powers of two, and serving to give different octaves of the same note.

24. In an electrical music-generating system, an organization of vibration-generating devices, for producing electrical vibrations corresponding to the notes of a musical scale through a range greater than one octave, in combination with vibration-translating apparatus, whereby electrical vibrations are translated into audible vibrations; said organization of vibration-generating devices, including (a) a plurality of alternators; and (b) shafts equal in number to the notes of the musical scale aforesaid within the compass of an octave; said shafts corresponding each to one of the notes of said scale, in that it serves to give movement to the alternator whose vibrations produce such note in the vibration-translating device; different shafts rotating with different angular velocities; each of a plurality of said shafts giving movement to a plurality of alternators whose vibration-frequencies correspond to different octaves of the note to which the shaft carrying such alternators corresponds.

25. In combination, in an electrical music-generating system, an organization of vibration-generating devices for producing electrical vibrations corresponding to the notes of a musical scale through a range greater than one octave; in combination with vibration-translating apparatus, whereby electrical vibrations are translated into audible vibrations; said organization of vibration-generating devices including (a) a plurality of alternators; and (b) twelve shafts corresponding respectively to the twelve notes of the chromatic scale, in that they serve respectively to give movement to the alternators whose vibrations produce the notes of the chromatic scale respectively, in the vibration-translating apparatus; different shafts rotating with different angular velocities; each of a plurality of said shafts giving movement to a plurality of alternators, whose vibration-frequencies correspond to different octaves of the note to which such shaft corresponds.

26. In combination, in an electrical music-generating system, (a) a series of alternators having vibration-frequencies corresponding to consecutive notes of a musical scale; (b) vibration-translating apparatus, whereby electrical vibrations are translated into audible vibrations; and (c) means whereby the notes, to which the alternators aforesaid respectively correspond, are caused, to sound, each as required, in the vibration-translating apparatus.

27. In combination, in an electrical music-generating apparatus, (a) a series of alternators having vibration-frequencies corresponding to consecutive notes of a musical scale through one or more octaves; (b) vibration-translating apparatus, whereby electrical vibrations are translated into audible vibrations; and (c) means whereby the notes, to which the alternators aforesaid respectively correspond, are caused to sound, each as required, in the vibration-translating apparatus.

28. In combination, in an electrical music-generating system, (a) a plurality of alternators having vibration-frequencies corresponding to musical notes of different pitches; (b) driving mechanism for said alternators, whereby different alternators are driven with different angular velocities; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

29. In combination, (a) a series of alternators having vibration-frequencies corresponding respectively to consecutive notes of a musical scale through one or more octaves; (b) driving mechanism for said alternators, whereby different alternators are driven with different angular velocities; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

30. In combination, in an electrical music-generating system, (a) an organization of alternators having vibration-frequencies corresponding to musical notes of different pitches; different alternators being constructed so that they produce respectively, different numbers of electrical vibrations per revolution; (b) driving mechanism for said alternators, whereby different alternators are driven with different angular velocities; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

31. In combination, (a) a plurality of alternators having vibration-frequencies corresponding to consecutive notes of a musical scale through one or more octaves; different alternators being arranged so that they produce, respectively, different numbers of electrical vibrations per revolution; (b) driving mechanism for said alternators, whereby different alternators are driven with different angular velocities; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

32. In combination, in an electrical music-generating system, (a) shafts equal in number to the notes of a musical scale within the compass of an octave, said shafts rotating with different angular velocities; (b) alternators receiving movement from said shafts and serving to produce electrical vibrations having frequencies corresponding to the notes of the scale; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

33. In combination, in an electrical music-generating system, (a) a plurality of shafts corresponding respectively to consecutive notes of a musical scale, and rotating respectively with angular velocities having the same numerical ratios as the vibration-frequencies of the notes to which they respectively correspond; (b) alternators receiving movement from said shafts and serving to produce electrical vibrations having frequencies corresponding to the notes of the scale to which such shafts respectively correspond; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

34. In combination, in an electrical music-generating system, (a) shafts, equal in number to the notes of a musical scale within the compass of an octave, said shafts corresponding each to a different one of said notes, and rotating with angular velocities having the same numerical ratios as the vibration-frequencies of the notes to which they respectively correspond; (b) alternators receiving movement from said shafts and serving to produce electrical vibrations having frequencies corresponding to the notes of the scale to which such shafts respectively correspond; (e) vibration-translating apparatus, whereby electrical vibrations are translated into audible vibrations; and (d) means whereby the notes, to which the alternators aforesaid respectively correspond, are caused to sound, each as required, in the vibration-translating apparatus.

35. In combination, in an electrical music-generating system, (a) a shaft; (b) a plurality of alternators carried by said shaft and having vibration-frequencies standing to each other as different powers of two, and serving to produce electric vibrations corresponding to different octaves of the same musical note; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

36. In combination, in an electrical music-generating system, (a) alternators for producing electrical vibrations corresponding to musical notes of different pitches; (b) a plurality of shafts rotating with different angular velocities, and each giving movement to a plurality of the alternators aforesaid having vibration-frequencies standing to each other numerically as different powers of two, and serving to produce electric vibrations corresponding to different octaves of the same note; (c) vibration-translating apparatus, whereby electrical vibrations are translated into audible vibrations; and (d) means whereby the notes, to which the alternators aforesaid respectively correspond, are caused to sound, each as required, in the vibration-translating apparatus.

37. In combination, in an electrical music-generating system, (A) an organization of vibration generating devices for producing the notes of a musical scale electrically through a range greater than one octave; said organization including (a) a plurality of alternators; and (b) shafts equal in number to the notes of the musical scale aforesaid within the compass of an octave; different shafts rotating with different angular velocities; said shafts each, in general, giving movement to a plurality of alternators having vibration-frequencies corresponding to different octaves of same note; the different shafts serving to drive alternators whose vibration-frequencies correspond respectively to different notes; (B) vibration-translating apparatus, whereby electrical vibrations are translated into audible vibrations; and (C) means whereby the notes, to which the alternators aforesaid respectively correspond, are caused to sound, each as required, in the vibration-translating apparatus.

38. In combination, in an electrical music-generating system, (a) a plurality of alternators; (b) a plurality of shafts corresponding respectively to consecutive notes of a musical scale and rotating respectively with angular velocities having the same numerical ratios as the vibration-frequencies of the notes to which they respectively correspond; each of said shafts giving movement to a plurality of alternators having vibration-frequencies corresponding to different octaves of the note to which such shaft corresponds; (c) vibration-translating apparatus, whereby electrical vibrations are translated into audible vibrations; and (*d*) means whereby the notes, to which the alternators aforesaid respectively correspond, are caused to sound, each as required, in the vibration-translating apparatus.

39. In combination, in an electrical music-generating system (A) an organization of vibration generating devices for producing the notes of a musical scale electrically through a range greater than one octave; said organization including (*a*) a plurality of alternators; (*b*) shafts equal in number to the notes of the scale aforesaid within the compass of one octave; said shafts corresponding each to one of said notes and rotating with angular velocities having the same numerical ratios as the vibration-frequencies of the notes to which they respectively correspond; each of a plurality of said shafts giving movement to a plurality of alternators having vibration-frequencies corresponding to different octaves of the note to which such shaft corresponds; (B) vibration - translating apparatus, whereby electrical vibrations are translated into audible vibrations; and (C) means whereby the notes, to which the alternators aforesaid respectively correspond, are caused to sound, each as required, in the vibration-translating apparatus.

40. In combination, in an electrical music-generating system, (*a*) a plurality of alternators having vibration-frequencies corresponding to different notes of a musical scale; (*b*) vibration-translating apparatus, whereby electrical vibrations are translated into audible vibrations; and (*c*) keys at a keyboard and means controlled thereby, whereby the notes, to which the alternators aforesaid respectively correspond, are caused to sound, each as required, in the vibration-translating apparatus.

41. In combination, in an electrical music-generating system, (*a*) a series of alternators having vibration-frequencies corresponding to consecutive notes of a musical scale through one or more octaves; (*b*) vibration-translating apparatus, whereby electrical vibrations are translated into audible vibrations; and (*c*) keys at a keyboard and means controlled thereby, whereby the notes, to which the alternators aforesaid respectively correspond, are caused to sound, each as required, in the vibration-translating apparatus.

42. In combination, in an electrical music-generating system, (*a*) a plurality of alternators having vibration-frequencies corresponding to musical notes of different pitches; (*b*) driving mechanism for said alternators, whereby different alternators are driven with different angular velocities; (*c*) vibration-translating apparatus, whereby electrical vibrations are translated into audible vibrations; and (*d*) keys at a keyboard and means controlled thereby, whereby the notes, to which the alternators aforesaid respectively correspond, are caused to sound, each as required, in the vibration-translating apparatus.

43. In combination, in an electrical music-generating system, (*a*) a series of alternators having vibration-frequencies corresponding respectively to consecutive notes of a musical scale through one or more octaves; (*b*) driving mechanism for said alternators, whereby different alternators are driven with different angular velocities; (*c*) vibration - translating apparatus, whereby electrical vibrations are translated into audible vibrations; and (*d*) keys at a keyboard and means controlled thereby, whereby the notes, to which the alternators aforesaid respectively correspond, are caused to sound, each as required, in the vibration-translating apparatus.

44. In combination, in an electrical music-generating system, (*a*) shafts equal in number to the notes of a musical scale within the compass of an octave, said shafts rotating with different angular velocities; (*b*) alternators receiving movement from said shafts and serving to produce electrical vibrations corresponding to the notes of the musical scale aforesaid; (*c*) vibration-translating apparatus, whereby electrical vibrations are translated into audible vibrations; and (*d*) keys at a keyboard and means controlled thereby, whereby the notes, to which the alternators aforesaid respectively correspond, are caused to sound, each as required, in the vibration-translating apparatus.

45. In combination, in an electrical music-generating system, (*a*) a shaft; (*b*) a plurality of alternators carried by said shaft and having vibration-frequencies standing to each other as different powers of two, and serving to produce electrical vibrations having frequencies corresponding to different octaves of the same musical note; (*c*) vibration - translating apparatus, whereby electrical vibrations are translated into audible vibrations; and (*d*) keys at a keyboard, a means controlled thereby whereby the notes, to which the alternators aforesaid respectively correspond, are caused to sound, each as required, in the vibration-translating apparatus.

46. In combination, in an electrical music-generating system, (*a*) a plurality of alternators having vibration-frequencies corresponding respectively to musical notes of different pitches; (*b*) a plurality of shafts rotating with different angular velocities, and each giving movement to a plurality of the alternators aforesaid having vibration-frequencies standing to each other numerically as different powers of two; (*c*) vibration-translating apparatus, whereby electrical vibrations are translated into audible vibrations;

and (d) keys at a keyboard and means controlled thereby, whereby the notes, to which the alternators aforesaid respectively correspond, are caused to sound, each as required, in the vibration-translating apparatus.

47. In combination, in an electrical music-generating system, an organization of vibration generating devices for producing the notes of a musical scale electrically, said organization including (a) a plurality of alternators; (b) shafts equal in number to the notes of the musical scale aforesaid within the compass of an octave, said shafts corresponding each to one of the notes of said scale, in that each in general gives movement to a plurality of the alternators aforesaid, having vibration frequencies corresponding to different octaves of one of the notes of the scale aforesaid; different shafts rotating with different angular velocities.

48. In combination in an electrical music-generating system, (A) an organization of vibration-generating devices for producing electrical vibrations corresponding to the notes of a musical scale, said organization including (a) a plurality of alternators; (b) shafts equal in number to the notes of the musical scale aforesaid within the compass of an octave; said shafts corresponding each to one of the notes of said scale, in that each in general gives movement to a plurality of the alternators aforesaid, having vibration frequencies corresponding to different octaves of one of the notes of the scale aforesaid; different shafts rotating with different angular velocities; (B) vibration-translating apparatus, whereby electrical vibrations are translated into audible vibrations; and (C) means whereby the notes, to which the alternators aforesaid respectively correspond, are caused to sound, each as required, in the vibration-translating apparatus.

49. In combination in an electrical music-generating system, (A) an organization of vibration-generating devices for producing electrical vibrations corresponding to the notes of a musical scale, said organization including (a) a plurality of alternators; (b) shafts equal in number to the notes of the musical scale aforesaid within the compass of an octave; said shafts corresponding each to one of the notes of said scale, in that each in general gives movement to a plurality of the alternators aforesaid, having vibration frequencies corresponding to different octaves of one of the notes of the scale aforesaid; different shafts rotating with different angular velocities; (B) vibration-translating apparatus, whereby electrical vibrations are translated into audible vibrations; and (C) keys at a keyboard and means controlled thereby, whereby the notes to which the alternators aforesaid respectively correspond, are caused to sound, each as required, in the vibration-translating apparatus.

50. In combination, in an electrical music-generating system, (A) an organization of vibration generating devices for producing the notes of a musical scale electrically; said organization including (a) a plurality of alternators; (b) shafts equal in number to the notes of the scale aforesaid within the compass of an octave; said shafts corresponding each to one of said notes and rotating with angular velocities having the same numerical ratios as the vibration-frequencies of the notes to which they respectively correspond; each of a plurality of said shafts giving movement to a plurality of alternators having vibration-frequencies of alternators having vibration-frequencies corresponding to different octaves of the note to which such shaft corresponds; (B) vibration-translating apparatus, whereby electrical vibrations are translated into audible vibrations; and (C) keys at a keyboard and means controlled thereby, whereby the notes, to which the alternators aforesaid respectively correspond, are caused to sound, each as required, in the vibration-translating apparatus.

51. In combination in an electrical music-generating system, (a) a plurality of alternators having vibration-frequencies corresponding to musical notes of different pitches; (b) one or more common-receiver vibration-translating devices; and (c) means whereby the notes, to which the alternators aforesaid respectively correspond, are caused to sound, each as required, in the vibration-translating apparatus aforesaid.

52. In combination, in an electrical music-generating system, (a) a series of alternators having vibration-frequencies corresponding to consecutive notes of a musical scale through one or more octaves; (b) one or more common-receiver vibration-translating devices; and (c) means whereby the notes, to which the alternators aforesaid respectively correspond, are caused to sound, each as required, in the vibration-translating apparatus aforesaid.

53. In combination, in an electrical music-generating system, (a) a plurality of alternators having vibration-frequencies corresponding to musical notes of different pitches; (b) driving mechanism for said alternators, whereby different alternators are driven with different angular velocities; (c) one or more common-receiver vibration-translating devices; and (d) means whereby the notes, to which the alternators aforesaid respectively correspond, are caused to sound, each as required, in the vibration-translating apparatus aforesaid.

54. In combination, (a) a series of alternators having vibration-frequencies corresponding respectively to consecutive notes of a musical scale through one or more octaves; (b) driving mechanism for said alternators, whereby different alternators are driven with different angular velocities; (c) a common-receiver vibration-translating device; and (d) means whereby the notes, to which the alternators aforesaid respectively correspond, are caused to sound, each as required, in the vibration-translating apparatus aforesaid.

55. In combination, in an electrical music-generating system, (a) shafts equal in number to the notes of a musical scale within the compass of an octave, said shafts rotating with different angular velocities; (b) alternators receiving movement from said shafts and serving to produce electrical vibrations corresponding to the notes of the scale to which the shafts driving said alternators, respectively, correspond; (c) one or more common-receiver vibration-translating devices; and (d) means whereby the notes, to which the alternators aforesaid respectively correspond, are caused to sound, each as required, in the vibration-translating apparatus aforesaid.

56. In combination, in an electrical music-generating system, (a) shafts, equal in number to the notes of a musical scale within the compass of an octave, said shafts corresponding each to a different one of said notes, and rotating with angular velocities having the same numerical ratios as the vibration-frequencies of the notes to which they respectively correspond; (b) alternators receiving movement from said shafts and serving to produce electrical vibrations having frequencies corresponding to the notes of the scale to which such shafts respectively correspond; (c) one or more common-receiver vibration-translating devices; and (d) means whereby the notes, to which the alternators aforesaid respectively correspond, are caused to sound, each as required, in the vibration-translating apparatus aforesaid.

57. In combination, in an electrical music-generating system, (a) a shaft; (b) a plurality of alternators carried by said shaft and having vibration-frequencies standing to each other as different powers of two, and serving to produce electrical vibrations corresponding to different octaves of the same note; (c) one or more common-receiver vibration-translating devices; and (d) means whereby the notes, to which the alternators aforesaid respectively correspond, are caused to sound, each as required, in the vibration-translating apparatus aforesaid.

58. In combination, in an electrical music-generating system, (a) a plurality of alternators for producing electrical vibrations corresponding to musical notes of different pitches; (b) a plurality of shafts each giving movement to a plurality of said alternators having vibration-frequencies standing to each other numerically as different powers of two; (c) one or more common-receiver vibration-translating devices; and (d) means whereby the notes, to which the alternators aforesaid respectively correspond, are caused to sound, each as required, in the vibration-translating apparatus aforesaid.

59. In combination, in an electrical music-generating system, (A) an organization of vibration generating devices for producing electrical vibrations having frequencies corresponding to the notes of a musical scale through a range greater than one octave, said organization including (a) a plurality of alternators; (b) shafts equal in number to the notes of the scale aforesaid within the compass of an octave, said shafts corresponding each to a different one of the notes of said scale, and each, in general, giving movement to a plurality of alternators having vibration-frequencies corresponding to different octaves of the note to which such shaft corresponds; (B) one or more common-receiver vibration-translating devices; and (C) means whereby the notes, to which the alternators aforesaid respectively correspond, are caused to sound, each as required, in the vibration-translating apparatus aforesaid.

60. In combination, in an electrical music-generating system, (a) a plurality of alternators having vibration-frequencies corresponding to musical notes of different pitches; (b) one or more common-receiver vibration-translating devices; and (c) keys at a keyboard, and means controlled thereby whereby the notes, to which the alternators aforesaid respectively correspond, are caused to sound, each as required, in the vibration-translating apparatus aforesaid.

61. In combination, in an electrical music-generating system, (a) a series of alternators having vibration-frequencies corresponding to consecutive notes of a musical scale through one or more octaves; (b) one or more common-receiver vibration-translating devices; and (c) keys at a keyboard, and means controlled thereby whereby the notes, to which the alternators aforesaid respectively correspond, are caused to sound, each as required, in the vibration-translating apparatus aforesaid.

62. In combination, in an electrical music-generating system, (a) a plurality of alternators having vibration-frequencies corresponding to musical notes of different pitches; (b) driving mechanism for said alternators, whereby different alternators are driven with different angular velocities; (c) one or more common-receiver vibration-translating devices; and (d) keys at a keyboard, and means controlled thereby whereby the notes, to which the alternators aforesaid respectively correspond, are caused to sound, each as required, in the vibration-translating apparatus aforesaid.

63. In combination, in an electrical music-generating system, (a) a series of alternators having vibration-frequencies corresponding respectively to consecutive notes of a musical scale through one or more octaves; (b) driving mechanism for said alternators, whereby different alternators are driven with different angular velocities; (c) one or more common-receiver vibration-translating devices; and (d) keys at a keyboard, and means controlled thereby whereby the notes, to which the alternators aforesaid respectively correspond, are caused to sound, each as required, in the vibration-translating apparatus aforesaid.

64. In combination, in an electrical-music generating system, (a) alternators; (b) shafts equal in number to the notes of a musical scale within the compass of an octave; said shafts each giving movement to one or more of the alternators aforesaid; the alternators carried by the several shafts aforesaid, serving to produce electrical vibrations corresponding to the notes of a musical scale; (c) one or more common-receiver vibration-translating devices; and (d) keys at a keyboard, and means controlled thereby, whereby the notes, to which the alternators aforesaid respectively correspond, are caused to sound, each as required, in the vibration-translating apparatus aforesaid.

65. In combination, in an electrical music-generating system, (a) a plurality of shafts corresponding respectively to consecutive notes of a musical scale, and rotating respectively with angular velocities having the same numerical ratios as the vibration-frequencies of the notes to which they respectively correspond; (b) alternators receiving movement from said shafts and serving to produce electrical vibrations having frequencies corresponding to the notes of the scale to which such shafts respectively correspond; (c) one or more common-receiver vibration-translating devices; and (d) keys at a keyboard, and means controlled thereby whereby the notes, to which the alternators aforesaid respectively correspond, are caused to sound, each as required, in the vibration-translating apparatus aforesaid.

66. In combination, in an electrical music-generating system, (a) shafts, equal in number to the notes of a musical scale within the compass of an octave, said shafts corresponding each to a different one of said notes, and rotating with angular velocities having the same numerical ratios as the vibration-frequencies of the notes to which they respectively correspond; (b) alternators receiving movement from said shafts and serving to produce electrical vibrations having frequencies corresponding to the notes of the scale to which such shafts respectively correspond; (c) one or more common-receiver vibration-translating devices and (d) keys at a keyboard, and means controlled thereby whereby the notes, to which the alternators aforesaid respectively correspond, are caused to sound, each as required, in the vibration-translating apparatus aforesaid.

67. In combination, in an electrical music-generating system, (a) a shaft; (b) a plurality of alternators carried by said shaft and having vibration-frequencies standing to each other as different powers of two, and serving to produce electrical vibrations corresponding to different octaves of the same note; (c) one or more common-receiver vibration-translating devices; and (d) keys at a keyboard, and means controlled thereby whereby the notes, to which the alternators aforesaid respectively correspond, are caused to sound, each as required, in the vibration-translating apparatus aforesaid.

68. In combination, in an electrical-music generating system (a) a plurality of alternators; (b) a plurality of shafts, each giving movement to a plurality of the alternators aforesaid; said shafts corresponding to different notes of the musical scale, in that each gives movement to a plurality of the alternators aforesaid, having vibration-frequencies standing to each other numerically as different powers of two, and serving to produce different octaves of that note of the scale aforesaid, to which the shaft giving them movement corresponds; (c) a common-receiver vibration-translating device; and (d) keys at a keyboard, and means controlled thereby, whereby the notes, to which the alternators aforesaid respectively correspond, are caused to sound, each as required, in the vibration-translating device aforesaid.

69. In combination, in an electrical music-generating system, (a) a plurality of alternators; (b) shafts equal in number to the notes of a musical scale within the compass of an octave; said shafts each corresponding to one of said notes in that each gives movement to a plurality of the alternators aforesaid having vibration-frequencies standing to each other numerically as powers of two, and serving to produce electrical vibrations corresponding to different octaves of the note to which such shaft corresponds; (c) one or more common-receiver vibration-translating devices; and (d) keys at a keyboard, and means controlled thereby whereby the notes, to which the alternators aforesaid respectively correspond, are caused to sound, each as required, in the vibration-translating apparatus aforesaid.

70. In combination, in an electrical music-generating system; (a) a line; (b) a plurality of alternators having vibration-frequencies corresponding to musical notes of different pitches; (c) note-controlling devices, whereby the alternators aforesaid are caused to throw their vibrations upon the line aforesaid, as required, and (d) one or more common-receiver vibration-translating devices fed with electrical vibrations from said line.

71. In combination, in an electrical music-generating system, (a) a line; (b) a series of alternators having vibration-frequencies corresponding to consecutive notes of a musical scale through one or more octaves; (c) note-controlling devices whereby the alternators aforesaid are caused to throw their vibrations upon the line aforesaid, as required; and (d) one or more common-receiver vibration-translating devices, fed with electrical vibrations from said line.

72. In combination, in an electrical music-generating system, (a) a line; (b) a plurality of alternators for producing electrical vibrations corresponding to musical notes of different pitches in the line aforesaid; (c) driving mechanism for said alternators, whereby different alternators are driven with different angular velocities; (d) note-controlling devices, whereby the alternators aforesaid are caused to throw their vibration upon the line aforesaid, as required; and (e) one or more common-receiver vibration-translating devices, fed with electrical vibrations from said line.

73. In combination, in an electrical music-generating system, (a) a line; (b) a series of alternators for producing musical vibrations in the line aforesaid; said alternators having vibration-frequencies corresponding to the notes of a musical scale through one or more octaves; (c) driving mechanism for said alternators, whereby different alternators are driven with different angular velocities; (d) note-controlling devices, whereby the alternators aforesaid are caused to throw their vibrations upon the line aforesaid, as required; and (e) one or more common-receiver vibration-translating devices, fed with electrical vibrations from said line.

74. In combination, in an electrical music-generating system, (a) a line; (b) shafts equal in number to the notes of a musical scale within the compass of an octave; said shafts rotating with different angular velocities; (c) alternators receiving movement from said shafts and serving to produce electrical vibrations corresponding to the notes of the scale to which the shafts respectively driving them correspond, in the line aforesaid, as required; (d) means whereby the alternators aforesaid are caused to throw their respective vibrations upon the line aforesaid, as required; and (e) one or more common-receiver vibration-translating devices for translating into audible vibration the electrical vibrations produced in the line aforesaid.

75. In combination, in an electrical music-generating system, (a) a line; (b) a plurality of alternators; (c) shafts equal in number to the notes of a musical scale within the compass of an octave; said shafts corresponding each to a different one of the notes of said scale, in that each, in general, gives movement to a plurality of the alternators aforesaid having vibration-frequencies corresponding to different octaves of the note to which such shaft corresponds; (d) means whereby the alternators aforesaid are caused to throw their respective vibrations upon the line aforesaid, as required; and (e) one or more common-receiver vibration-translating devices for translating into audible vibrations the electrical vibrations produced in the line aforesaid.

76. In combination, in an electrical music-generating system, (a) a line; (b) a plurality of alternators having vibration-frequencies corresponding to musical notes of different pitches; (c) one or more common-receiver vibration-translating devices; and (d) keys at a keyboard, whereby the alternators aforesaid are caused to throw their vibrations upon the line aforesaid to sound the respective notes, each as required, in the vibration-translating apparatus.

77. In combination, in an electrical music-generating system, (a) a line; (b) a series of alternators having vibration-frequencies corresponding to consecutive notes of a musical scale through one or more octaves; (c) one or more common-receiver vibration-translating devices; and (d) keys at a keyboard, whereby the alternators aforesaid are caused to throw their vibrations upon the line aforesaid to sound the corresponding notes, as required, in the vibration-translating apparatus.

78. In combination, in an electrical music-generating system, (a) a line; (b) a plurality of alternators for producing electrical vibrations corresponding to musical notes of different pitches in the line aforesaid; (c) driving mechanism for said alternators whereby different alternators are driven with different angular velocities; (d) one or more common-receiver vibration-translating devices receiving vibrations from the line aforesaid; and (e) keys at a keyboard, whereby the alternators aforesaid are caused to throw their vibrations upon the line aforesaid to sound the corresponding notes, as required, in the vibration-translating apparatus.

79. In combination, in an electric music-generating system, (a) a line circuit; and (b) alternators having vibration-frequencies corresponding to consecutive notes of a musical scale; the armature circuits of said alternators acting inductively on the line circuit aforesaid to produce musical electrical vibrations therein.

80. In combination, in an electrical music-generating system, (a) alternators having vibration-frequencies corresponding to the notes of a musical scale through one or more octaves; and (b) a line circuit to which vibrations are transferred by induction from the armature-circuits of the alternators aforesaid.

81. In combination, in an electrical music-generating system, (a) a plurality of alternators having vibration-frequencies corresponding to musical notes of different pitches; (b) a line circuit to which vibrations are transferred by induction from the alternators aforesaid; (c) one or more common-receiver vibration-translating devices fed with electrical vibrations from said line circuit; and (d) means whereby the different alternators aforesaid are caused to act inductively upon the line circuit aforesaid, each as required, to produce electrical vibrations therein, whereby musical sounds are produced in the common-receivers aforesaid.

82. In combination, in an electrical music-generating system, (a) alternators having vibration-frequencies corresponding to the notes of a musical scale through one or more octaves; (b) a line circuit to which vibrations are transferred by induction from the alternators aforesaid; (c) one or more common-receiver vibration-translating devices fed with electrical vibrations from said line circuit; and (d) means whereby the different alternators aforesaid are caused to act inductively upon the line circuit aforesaid, each as required, to produce electrical vibrations therein, whereby musical sounds are produced in the common-receivers aforesaid.

83. In combination, in an electrical music-generating system, (a) a line circuit; (b) one or more common-receiver vibration-translating devices fed with electrical vibrations from said line circuits; (c) a plurality of alternators having vibration-frequencies corresponding to musical notes of different pitches; (d) circuits inductively intermediate the armature circuits of the alternators aforesaid and the line circuits aforesaid; and (e) keys inserted in said inductively-intermediate circuits.

84. In combination, in an electrical music-generating system, (a) a line circuit; (b) one or more common-receiver vibration-translating devices fed with electrical vibrations from said line circuit; (c) alternators having vibration-frequencies corresponding to the notes of a musical scale through one or more octaves; (d) circuits inductively intermediate the armature circuits of the alternators aforesaid and the line circuit aforesaid; and (e) keys inserted in said inductively-intermediate circuits.

85. In combination, in an electrical music-generating system, (a) a plurality of circuits; and (b) alternators having vibration-frequencies corresponding to a plurality of consecutive notes of a musical scale, for producing electrical vibrations in said circuits; said circuits being arranged in parallel, with a common-return portion.

86. In combination, in an electrical music-generating system, (a) a plurality of circuits; and (b) alternators having vibration-frequencies corresponding to consecutive notes of a musical scale through one or more octaves for producing electrical vibrations in said circuits, said circuits being arranged in parallel, with a common-return portion.

87. In combination, in an electrical music-generating system, (a) a plurality of circuits; (b) keys inserted in said circuits; and (c) alternators, having vibration-frequencies corresponding to a plurality of consecutive notes of a musical scale, for producing electrical vibrations in said circuits, said circuits being arranged in parallel with a common-return portion, wherein composite electrical vibrations are produced when a plurality of the circuits aforesaid are closed simultaneously.

88. In combination, in an electrical music-generating system, (a) a plurality of circuits; (b) alternators having vibration-frequencies corresponding to consecutive notes of a musical scale through one or more octaves, for producing electrical vibrations in said circuits; said circuits being arranged in parallel, with a common-return portion, wherein composite electrical vibrations are produced when a plurality of the circuits aforesaid are closed simultaneously.

89. In combination, in an electrical music-generating system, (a) a plurality of circuits arranged in parallel; (b) alternators whereby electrical vibrations having frequencies corresponding to musical notes of different pitches are produced in said circuits; (c) an inductorium, whose primary forms a common-return portion for the parallel circuits aforesaid, and whose secondary receives vibrations from all said circuits, each as required; and (d) one or more common-receiver vibration-translating devices, fed with vibrations from the secondary circuit of said inductorium.

90. In combination, in an electrical music-generating system, (a) plurality of circuits arranged in parallel; (b) alternators having vibration-frequencies corresponding to consecutive notes of a musical scale through one or more octaves, for producing electrical vibrations in said circuits; (c) an inductorium, whose primary forms a common-return portion for the parallel circuits aforesaid, and whose secondary receives vibrations from all said circuits, each as required; and (d) one or more common-receiver vibration-translating devices, fed with vibrations from the secondary circuit of said inductorium.

91. In combination, in an electrical music-generating system, (a) a plurality of circuits arranged in parallel; (b) keys inserted in said circuits; (c) alternators whereby electrical vibrations having frequencies corresponding to musical notes of different pitches are produced in said circuits; and (d) an inductorium whose primary forms a common-return for the parallel circuits aforesaid.

92. In combination, in an electrical music-generating system, (a) a plurality of circuits arranged in parallel; (b) keys inserted in said circuits; (c) alternators whereby electrical vibrations having frequencies corresponding to musical notes of different pitches are produced in said circuits; (d) an inductorium whose primary forms a common return for the parallel circuits aforesaid, and whose secondary receives vibrations by induction from all said parallel circuits, each as required; and (e) one or more common-receiver vibration-translating devices, fed with vibrations from the secondary of said inductorium.

93. In combination, in an electrical music-generating system, (a) a plurality of circuits arranged in parallel; (b) keys inserted in said circuits; (c) alternators having vibration-frequencies corresponding to consecutive notes of a musical scale through one or more octaves, for producing electrical vibrations in said circuits; (d) an inductorium, whose primary forms a common return for the parallel circuits aforesaid, and whose secondary receives vibrations by induction from all said parallel circuits, each as required; and (e) one or more common-receiver vibration-translating devices, fed with vibrations from the secondary of said inductorium.

94. In combination, in an electrical music-generating system, (a) circuits corresponding to consecutive notes of a musical scale; (b) keys inserted in said circuits; (c) alternators, whereby electrical vibrations are produced in the different circuits aforesaid in each circuit, electrical vibrations of the frequency required to produce the note to which such circuit corresponds; said circuits being arranged in parallel, with a common-return portion, wherein composite electrical vibrations are produced when a plurality of said circuits are closed simultaneously.

95. In combination, in an electrical music-generating system, (a) circuits corresponding to consecutive notes of a musical scale through one or more octaves; (b) keys inserted in said circuits; (c) alternators whereby electrical vibrations are produced in the different circuits aforesaid in each circuit, electrical vibrations of the frequency required to produce the note to which such circuit corresponds; said circuits being arranged in parallel, with a common-return portion, wherein composite electrical vibrations are produced when a plurality of said circuits are closed simultaneously.

96. In combination, in an electrical music-generating system, (a) circuits corresponding to musical notes of different pitches; said circuits being arranged in parallel; (b) keys inserted in said circuits; (c) alternators whereby electrical vibrations are produced in the different circuits aforesaid in each circuit, electrical vibrations of the frequency required to produce the note to which such circuit corresponds; (d) an inductorium whose primary coil forms a common-return portion for the parallel circuits aforesaid and whose secondary circuit receives vibrations by induction from all said parallel circuits, each as required; and (e) one or more common-receiver vibration-translating devices, fed with electrical vibrations from the secondary circuit of said inductorium.

97. In combination, in an electrical music-generating system, (a) circuits corresponding to consecutive notes of a musical scale through one or more octaves; said circuits being arranged in parallel; (b) keys inserted in said circuits; (c) alternators whereby electrical vibrations are produced in the different circuits aforesaid in each circuit, electrical vibrations of the frequency required to produce the note to which such circuit corresponds; (d) an inductorium, whose primary coil forms a common-return portion for the parallel circuits aforesaid and whose secondary circuit receives vibrations by induction from all said parallel circuits, each as required; and (e) one or more common-receiver vibration-translating devices, fed with electrical vibrations from the secondary circuit of said inductorium.

98. In combination, in an electrical music-generating system, (a) a plurality of alternators having vibration-frequencies corresponding to a plurality of consecutive notes of a musical scale; and (b) tone-purifying apparatus for assimilating the electrical vibrations produced by said alternators to sine waves.

99. In combination, in an electrical music-generating system, (a) a plurality of alternators having vibration-frequencies corresponding to a plurality of consecutive notes of a musical scale; and (b) tone-purifying devices equal in number to the alternators aforesaid, a tone-purifying device for each alternator.

100. In combination, in an electrical music-generating system, (a) alternators having vibration-frequencies corresponding to notes of a musical scale through one or more octaves; and (b) tone-purifying apparatus for purifying the electrical vibrations produced by said alternators.

101. In combination, in an electrical music-generating system, (a) alternators having vibration-frequencies corresponding to notes of a musical scale through one or more octaves; and (b) tone-purifying devices equal in number to the alternators aforesaid; a tone-purifying device for each alternator.

102. In combination, in an electrical music-generating system, (a) a plurality of alternators for producing electrical vibrations corresponding to musical notes of different pitches; (b) tone-purifying apparatus; (c) one or more common-receiver vibration-translating devices; and (d) note-controlling devices, whereby the notes, to which the alternators aforesaid respectively correspond, are caused to sound, each as required, in the vibration-translating apparatus aforesaid.

103. In combination, in an electrical music-generating system, (a) alternators having vibration-frequencies corresponding to the notes of a musical scale through one or more octaves; (b) tone-purifying apparatus; (c) vibration-translating apparatus, whereby electrical vibrations are translated into audible vibrations; and (d) note-controlling devices, whereby the notes, to which the alternators aforesaid respectively correspond, are caused to sound, each as required, in the vibration-translating apparatus aforesaid.

104. In combination, in an electrical music-generating system, (a) vibration-translating apparatus; (b) a plurality of alternators having vibration-frequencies corresponding to musical notes of different pitches; (c) note-controlling devices, whereby said alternators are caused to communicate vibrations to the vibration-translating apparatus aforesaid, each alternator as required; and (d) means intermediate the armature circuits of said alternators and the vibration-translating apparatus aforesaid, operating by successive inductive transfers to assimilate the electrical vibrations communicated by said alternators to the vibration-translating apparatus aforesaid to sine waves.

105. In combination, in an electrical music-generating system, (a) vibration-translating apparatus; (b) alternators having vibration-frequencies corresponding to the notes of a musical scale through one or more octaves; (c) note-controlling devices, whereby said alternators are caused to communicate vibrations to the vibration-translating apparatus aforesaid, each alternator as required; and (d) means intermediate the armature circuits of said alternators and the vibration-translating apparatus aforesaid, operating by successive inductive transfers, to assimilate the electrical vibrations communicated by said alternators to the vibration-translating apparatus aforesaid to sine waves.

106. An electrical music-generating system including, in combination, (a) a line circuit; (b) an alternator for producing electrical vibrations corresponding to a musical note in said line circuit by induction; and (c) one or more circuits inductively intermediate the armature circuit of said alternator and the line circuit aforesaid, operating to assimilate the electrical vibrations communicated from said alternator to said line circuit to the sine form, by successive inductive transfers.

107. An electrical music-generating and distributing system, in which musical vibrations corresponding to the notes of a tune are produced at a central station in the form of electrical vibrations, and distributed therefrom by lines or mains to the premises of subscribers, said system including (a) vibration-translating devices located on different premises; (b) one or more lines or mains connecting said vibration-translating devices with the central station; (c) an alternator at the central station for producing electrical vibrations corresponding to a musical note in the lines or mains aforesaid by induction; and (d) one or more circuits inductively intermediate the armature circuit of said alternator and the line or mains aforesaid, operating to assimilate the electrical vibrations propagated from said alternator to the line or mains aforesaid, to the sine form, by inductive transfer.

108. An electrical music-generating and distributing system, in which musical vibrations corresponding to the notes of a tune are produced at a central station in the form of electrical vibrations, and distributed therefrom by a line or mains to the premises of subscribers, said system including (a) a plurality of vibration-translating devices, located respectively on different premises and serving to translate electrical vibrations into audible aerial vibrations; (b) an alternator at the central station aforesaid; (c) one or more lines or mains connecting the vibration translating device aforesaid with the central station aforesaid; and (d) means whereby the alternator aforesaid is made to act on the lines or mains aforesaid, when required, to produce its appropriate electrical vibrations in the lines or mains aforesaid, whereby the note whose vibration-frequency corresponds to that of said alternator is sounded simultaneously in the vibration-translating devices, located on the different premises aforesaid.

109. In combination, in an electrical music-generating system, (a) a line circuit; (b) a plurality of alternators having vibration-frequencies corresponding to musical notes of different pitches, for producing electrical vibrations in said line circuit; (c) one or more common-receiver vibration-translating devices, fed with electrical vibrations from said line circuit; (d) means whereby the different alternators aforesaid are caused to throw their respective vibrations upon the line aforesaid, each alternator as required; and (e) tone-purifying apparatus, whereby the electrical vibrations thrown upon the line by the several alternators aforesaid are caused to be more nearly sinusoidal than the vibrations generated in the armature circuits of said alternators.

110. In combination, in an electrical music-generating system, (a) a line circuit; (b) alternators having vibration-frequencies corresponding to the notes of a musical scale through one or more octaves for producing electrical vibrations in said line circuit; (c) one or more common-receiver vibration-translating devices, fed with electrical vibrations from said line circuit; (d) means whereby the different alternators aforesaid are caused to throw their respective vibrations upon the line aforesaid, each alternator as required; and (e) tone-purifying apparatus whereby the electrical vibrations thrown upon the line by the several alternators aforesaid are caused to be more nearly sinusoidal than the vibrations generated in the armature circuits of said alternators.

111. In combination, in an electrical music-generating system, (a) a line circuit; (b) a plurality of alternators having vibration-frequencies corresponding to musical notes of different pitches, for producing electrical vibrations in said line circuit; (c) one or more common-receiver vibration-translating devices fed with electrical vibrations from said line circuit; (d) means whereby the different alternators aforesaid are caused to throw their respective vibrations upon the line aforesaid, each alternator as required; and (e) tone-purifying devices equal in number to the alternators aforesaid, a tone-purifying device for each alternator, whereby the vibrations thrown upon the line by said alternators are assimilated to the sine form.

112. In combination, in an electrical music-generating system, (a) a line circuit; (b) alternators having vibration-frequencies corresponding to the notes of a musical scale through one or more octaves for producing electrical vibrations in said line circuit; (c) one or more common-receiver vibration-translating devices fed with electrical vibrations from said line circuit; (d) means whereby the different alternators aforesaid are caused to throw their respective vibrations upon the line aforesaid, each alternator as required; and (e) tone-purifying devices equal in number to the alternators aforesaid, a tone-purifying device for each alternator whereby the electrical vibrations thrown upon the line by such alternators are assimilated to the sine form.

113. An apparatus for generating and distributing music electrically including, in combination, (a) alternators at a central station for producing electrical vibrations corresponding to musical notes of different pitches; (b) vibration-translating apparatuses, for translating electrical vibrations into audible vibrations, located at different points more or less remote from said central station; and (c) means whereby the alternators aforesaid are caused to act on a plurality of the separately-located vibration-translating apparatuses aforesaid to produce the same musical notes from said vibration-translating apparatuses simultaneously.

114. An apparatus for generating and distributing music electrically including, in combination, (a) alternators at a central station having vibration-frequencies corresponding to the notes of a musical scale through one or more octaves; (b) vibration-translating apparatuses, for translating electrical vibrations into audible vibrations, located at different points more or less remote from said central station; and (c) means whereby the alternators aforesaid are caused to act on a plurality of the separately-located vibration-translating apparatuses aforesaid, to produce the same tune from said vibration-translating apparatuses simultaneously.

115. An apparatus for generating and distributing music electrically including, in combination, (a) alternators at a central station for producing electrical vibrations corresponding to musical notes of different pitches; (b) a plurality of common-receiver vibration-translating devices, located respectively at different points more or less remote from said central station; and (c) means whereby the alternators aforesaid are caused to act on a plurality of said separately-located common-receivers, each alternator as required, to produce the same musical notes simultaneously from said separately-located receivers.

116. An apparatus for generating and distributing music electrically including, in combination, (a) alternators at a central station having vibration-frequencies corresponding to the notes of a musical scale through one or more octaves; (b) a plurality of common-receiver vibration-translating devices located respectively at different points more or less remote from said central station; and (c) means whereby the alternators aforesaid are caused to act on a plurality of said separately located common-receivers, each alternator as required, to produce the same tune simultaneously from said separately-located common-receivers.

117. An apparatus for generating and distributing music electrically, including, in combination (a) alternators at a central station for producing electrical vibrations corresponding to musical notes of different pitches; (b) a plurality of common-receiver vibration-translating devices located respectively at different points more or less remote from said central station; (c) one or more lines for feeding vibrations from the central station aforesaid to the separately-located common-receivers aforesaid; and (d) note-controlling devices whereby the alternators aforesaid are caused to throw their vibrations, as required, upon the line or lines aforesaid, thereby to produce the same musical note simultaneously from a plurality of the separately-located common-receivers aforesaid.

118. An apparatus for generating and distributing music electrically, including, in combination (a) alternators at a central station having vibration-frequencies corresponding to the notes of a musical scale through one or more octaves; (b) a plurality of common-receiver vibration-translating devices, located respectively at different points more or less remote from said central station; (c) one or more lines for feeding vibrations from the central station aforesaid to the separately located common-receivers aforesaid; and (d) note-controlling devices, whereby the alternators aforesaid are caused to throw their vibrations, as required, upon the line or lines aforesaid, thereby to produce the same musical note simultaneously from a plurality of the separately-located common-receivers aforesaid.

119. An apparatus for generating and distributing music electrically, including, in combination, (a) alternators at a central station for producing electrical vibrations corresponding to musical notes of different pitches; (b) vibration-translating apparatuses, for translating electrical vibrations into audible vibrations, located at different points more or less remote from said central station; and (c) keys at a keyboard and means controlled by said keys, whereby the notes to which the alternators aforesaid respectively correspond are caused to sound, each as required, in a plurality of the separately-located vibration-translating devices aforesaid simultaneously.

120. An apparatus for generating and distributing music electrically, including, in combination, (a) alternators at a central station having vibration-frequencies corresponding to the notes of a musical scale through one or more octaves; (b) vibration-translating apparatuses, for translating electrical vibrations into audible vibrations, located at different points more or less remote from said central station; and (c) keys at a keyboard and means controlled by said keys, whereby the notes to which the alternators aforesaid respectively correspond are caused to sound, each as required, in a plurality of the separately-located vibration-translating devices aforesaid simultaneously.

121. An apparatus for generating and distributing music electrically, including, in combination, (a) alternators at a central station for producing electrical vibrations corresponding to musical notes of different pitches; (b) a plurality of common-receiver vibration-translating devices located respectively at different points more or less remote from said central station; (c) one or more lines for feeding vibrations from the central station aforesaid to the separately-located common-receivers aforesaid; and (d) keys at a keyboard, whereby the alternators aforesaid are caused to throw their vibrations upon the line or lines aforesaid, as required, to produce the same musical notes from a plurality of the separately-located common-receivers aforesaid simultaneously.

122. An apparatus for generating and distributing music electrically, including, in combination, (a) alternators at a central station, having vibration-frequencies corresponding to the notes of a musical scale through one or more octaves; (b) a plurality of common-receiver vibration-translating devices located respectively at different points more or less remote from said central station aforesaid; (c) one or more lines for feeding vibrations from the central station aforesaid to the separately-located common-receivers aforesaid; and (d) keys at a keyboard, whereby the alternators aforesaid are caused to throw their vibrations upon the line or lines aforesaid, as required, thereby to produce the same tune from a plurality of the separately located common-receivers aforesaid simultaneously.

123. An apparatus for generating and distributing music electrically, including, in combination, (a) alternators at a central station, for producing electrical vibrations corresponding to musical notes of different pitches; (b) vibration-translating devices, for translating electrical vibrations into audible vibrations, said vibration-translating devices being located at different points more or less remote from said central station; (c) vibration-propagating means, whereby vibrations are propagated from the central station aforesaid to the vibration-translating devices aforesaid; and (d) note-controlling devices, whereby the alternators aforesaid are caused to act on the vibration-propagating means aforesaid to produce, from the separately-located vibration-translating devices aforesaid, sounds corresponding in pitch to the frequencies of the vibrations produced by said alternators.

124. An apparatus for generating and distributing music electrically, including, in combination, (a) alternators at a central station having vibration-frequencies corresponding to consecutive notes of a musical scale through one or more octaves; (b) vibration-translating devices, for translating electrical vibrations into audible vibrations; said vibration-translating devices being located at different points more or less remote from said central station; (c) vibration-propagating means, whereby vibrations are propagated from the central station aforesaid to the vibration-translating devices aforesaid; and (d) note-controlling devices, whereby the alternators aforesaid are caused to act on the vibration-propagating means aforesaid to produce, from the separately-located vibration-translating devices aforesaid, sounds corresponding in pitch to the frequencies of the vibrations produced by said alternators.

125. An apparatus for generating and distributing music electrically, including, in combination, (a) alternators at a central station, for producing electrical vibrations corresponding to musical notes of different pitches; (b) vibration-translating devices, for translating electrical vibrations into audible vibrations, said vibration-translating devices being located at different points more or less remote from said central station; (c) vibration-propagating means, whereby vibrations are propagated from the central station aforesaid to the vibration-translating device aforesaid; and (d) keys at a keyboard, whereby the alternators aforesaid are caused to act on the vibration propagating means aforesaid, to produce, from the separately-located vibration-translating devices aforesaid, sounds corresponding in pitch to the frequencies of the vibrations produced by said alternators.

126. An apparatus for generating and distributing music electrically, including, in combination, (a) alternators at a central station having vibration-frequencies corresponding to consecutive notes of a musical scale through one or more octaves; (b) vibration-translating devices, for translating electrical vibrations into audible vibrations, said vibration-translating devices being located at different points more or less remote from said central station; (c) vibration propagating means, whereby vibrations are propagated from the central station aforesaid to the vibration-translating devices aforesaid; and (d) keys at a keyboard, whereby the alternators aforesaid are caused to act on the vibration-propagating means aforesaid to produce, from the separately-located vibration-translating devices aforesaid, sounds corresponding in pitch to the frequencies of the vibrations produced by said alternators.

127. An apparatus for generating and distributing music electrically, including, in combination, (a) alternators at a central station for producing electrical vibrations corresponding to musical notes of different pitches; (b) vibration-translating devices for translating electrical vibrations into audible vibrations, located at different points more or less remote from said central station, and adapted to be caused to act by the alternators aforesaid; and (c) note-controlling devices whereby the alternators aforesaid are caused to act, each as required, on the separately-located vibration-translating devices aforesaid to produce therefrom the notes to which such alternators respectively correspond.

128. An apparatus for generating and distributing music electrically, including, in combination, (a) alternators at a central station having vibration frequencies corresponding to consecutive notes of a musical scale; (b) vibration-translating devices for translating electrical vibrations into audible vibrations, located at different points more or less remote from said central station, and adapted to be caused to act by the alternators aforesaid; and (c) note-controlling devices whereby the alternators aforesaid are caused to act, each as required, on the separately-located vibration-translating devices aforesaid to produce therefrom the notes to which such alternators respectively correspond.

129. An apparatus for generating and distributing music electrically, including, in combination, (a) alternators at a central station, for producing electrical vibrations corresponding to musical notes of different pitches; (b) a plurality of common-receiver vibration-translating devices, for translating electrical vibrations into aerial vibrations; said vibration-translating devices being located respectively on different premises, more or less remote from the central-station aforesaid; (c) vibration-propagating means, whereby vibrations are propagated from the central station aforesaid to the vibration-translating devices aforesaid; and (d) note-controlling devices, whereby the alternators aforesaid are caused to act on the vibration-propagating means aforesaid to produce, from the sepearately-located vibration-translating devices aforesaid, sounds corresponding in pitch to the frequencies of the vibrations produced by said alternators.

130. An apparatus for generating and distributing music electrically, including, in combination, (a) alternators at a central station having vibration-frequencies corresponding to consecutive notes of a musical scale through one or more octaves; (b) a plurality of common-receiver vibration-translating devices, for translating electrical vibrations into audible aerial vibrations; said vibration-translating devices being located respectively on different premises, more or less remote from the central station aforesaid; (c) vibration-propagating means, whereby vibrations are propagated from the central station aforesaid to the vibration-translating devices aforesaid; and (d) note-controlling devices, whereby the alternators aforesaid are caused to act on the vibration-propagating means aforesaid to produce, from the separately-located vibration-translating devices aforesaid, sounds corresponding in pitch to the frequencies of the vibrations produced by said alternators.

131. An apparatus for generating and distributing music electrically, including, in combination, (a) alternators at a central station, for producing electrical vibrations corresponding to musical notes of different pitches; (b) a plurality of common-receiver vibration-translating devices, for translating electrical vibrations into audible aerial vibrations; said vibration-translating devices being located respectively on different premises, more or less remote from the central station aforesaid; (c) vibration-propagating means, whereby vibrations are propagated from the central station aforesaid to the vibration-translating devices aforesaid; and (d) keys at the keyboard, whereby the alternators aforesaid are caused to act on the vibration-propagating means aforesaid, to produce, from the separately-located vibration-translating devices aforesaid, sounds corresponding in pitch to the frequencies of the vibrations produced by said alternators.

132. An apparatus for generating and distributing music electrically, including, in combination, (a) alternators at a central station having vibration-frequencies corresponding to consecutive notes of a musical scale through one or more octaves; (b) a plurality of common-receiver vibration-translating devices, for translating electrical vibrations into audible aerial vibrations; said vibration-translating devices being located respectively on different premises, more or less remote from the central station aforesaid; (c) vibration-propagating means, whereby vibrations are propagated from the central station aforesaid to the vibration-translating devices aforesaid; and (d) keys at a keyboard, whereby the alternators aforesaid are caused to act on the vibration-propagating means aforesaid to produce, from the separately-located vibration-translating devices aforesaid, sounds corresponding in pitch to the frequencies of the vibrations produced by said alternators.

133. An apparatus for generating and distributing music electrically, including, in combination, (a) alternators at a central station for producing electrical vibrations corresponding to musical notes of different pitches; (b) a plurality of common-receiver vibration-translating devices, for translating electrical vibrations into audible aerial vibrations; said vibration-translating devices being located respectively on different premises, more or less remote from the central station aforesaid; and (c) note-controlling devices whereby the alternators aforesaid are caused to act, each as required, on the separately-located vibration-translating devices aforesaid to produce therefrom the notes to which such alternators respectively correspond.

134. An apparatus for generating and distributing music electrically, including, in combination, (a) alternators at a central station having vibration frequencies corresponding to consecutive notes of a musical scale; (b) a plurality of common-receiver vibration-translating devices, for translating electrical vibrations into audible aerial vibrations; said vibration-translating devices being located respectively on different premises, more or less remote from the central station aforesaid; and (c) note-controlling devices whereby the alternators aforesaid are caused to act, each as required, on the separately-located vibration-translating devices aforesaid to produce therefrom the notes to which such alternators respectively correspond.

135. An electrical music-generating apparatus, including, in combination, (a) a set of alternators for producing the requisite electrical vibrations; (b) vibration-translating apparatus, whereby electrical vibrations are translated into audible aerial vibrations; and (c) switchboard mechanism, having a switch for each of the alternators aforesaid; whereby each of said alternators may be made, when required, to act upon the vibration-translating apparatus by itself alone and independently of any other alternator.

136. An electrical music-generating apparatus, including, in combination, (a) a set of alternators for producing the requisite electrical vibrations; (b) vibration-translating apparatus, whereby electrical vibrations are translated into audible aerial vibrations; (c) switchboard mechanism, having a switch for each of the alternators aforesaid, whereby each of said alternators may be made, when required, to act upon the vibration-translating apparatus by itself alone and independently of any other alternator; and (d) keys at a keyboard, controlling the switches aforesaid.

137. An electrical music-generating apparatus, including, in combination, (a) a set of alternators for producing the requisite electrical vibrations; (b) shafts, whereon the rotary members of said alternators are mounted, each of a plurality of said shafts giving movement to alternators whose vibration-frequencies are numerically related as powers of two; (c) vibration-translating apparatus, whereby electrical vibrations are translated into audible aerial vibrations; and (d) switchboard mechanism, having a switch for each of the alternators aforesaid; whereby each of said alternators may be made, when required, to act upon the vibration-translating apparatus by itself alone and independently of any other alternator.

138. An electrical music-generating apparatus, including, in combination, (a) a set of alternators for producing the requisite electrical vibrations; (b) shafts, whereon the rotary members of said alternators are mounted, each of a plurality of said shafts giving movement to alternators whose vibration frequencies are numerically related as powers of two; (c) vibration-translating apparatus, whereby electrical vibrations are translated into audible aerial vibrations; (d) switchboard mechanism, having a switch for each of the alternators aforesaid, whereby each of said alternators may be made, when required, to act upon the vibration-translating apparatus by itself alone and independently of any other alternator; and (e) keys at a keyboard, controlling the switches aforesaid.

139. An apparatus for generating and distributing music electrically, including, in combination, (a) alternators at a central station, for producing electrical vibrations corresponding to musical notes of different pitches; (b) vibration translating devices, for translating electrical vibrations into audible vibrations, said vibration-translating devices being located at different points more or less remote from said central station; (c) vibration-propagating means, whereby vibrations are propagated from the central station aforesaid to the vibration-translating devices aforesaid; and (d) switchboard mechanism, having a switch for each of the alternators aforesaid, whereby each of said alternators may be made, when required, to act upon the vibration-translating apparatus by itself alone and independently of any other alternators.

140. An apparatus for generating and distributing music electrically, including, in combination, (a) alternators at a central station, for producing electrical vibrations corresponding to musical notes of different pitches; (b) vibration-translating devices, for translating electrical vibrations into audible vibrations, said vibration-translating devices being located at different points more or less remote from said central station; (c) vibration-propagating means, whereby vibrations are propagated from the central station aforesaid to the vibration-translating devices aforesaid; (d) switchboard mechanism, having a switch for each of the alternators aforesaid, whereby each of said alternators may be made, when required, to act upon the vibration-translating apparatus by itself alone and independently of any other alternator; and (e) keys at a keyboard, controlling the switches aforesaid.

141. An apparatus for generating and distributing music electrically, including in combination, (a) alternators at a central station, for producing electrical vibrations corresponding to musical notes of different pitches; (b) shafts whereon the rotary members of said alternators are mounted, each of a plurality of said shafts giving movement to a plurality of the alternators aforesaid, whose vibration-frequencies are numerically related as powers of two; (c) vibration-translating devices, for translating electrical vibrations into audible vibrations, said vibration-translating devices being located at different points more or less remote from said central station; (d) vibration-propagating means, whereby vibrations are propagated from the central station aforesaid to the vibration-translating devices aforesaid; and (e) switchboard mechanism, having a switch for each of the alternators aforesaid, whereby each of said alternators may be made, when required, to act upon the vibration-translating apparatus by itself alone and independently of any other alternators.

142. An apparatus for generating and distributing music electrically, including, in combination, (a) alternators at a central station, for producing electrical vibrations corresponding to musical notes of different pitches; (b) shafts, whereon the rotary members of said alternators are mounted, each of a plurality of said shafts giving movement to a plurality of the alternators aforesaid, whose vibration frequencies are numerically related as powers of two; (c) vibration-translating devices, for translating electrical vibrations into audible vibrations, said vibration-translating devices being located at different points more or less remote from said central station; (d) vibration-propagating means, whereby vibrations are propagated from the central station aforesaid to the vibration-translating devices aforesaid; (e) switchboard mechanism, having a switch for each of the alternators aforesaid, whereby each of said alternators may be made, when required, to act upon the vibration-translating apparatus by itself alone and independently of any other alternators; and (f) keys at a keyboard, controlling the switches aforesaid.

In testimony that I claim the foregoing as of my own invention, I have hereunto set my hand, at Washington, in the District of Columbia, this tenth day of February, A. D. 1902, in the presence of the subscribing witnesses whose signatures are hereto annexed.

THADDEUS CAHILL.

Attest:
 GEO. F. CAHILL,
 ARTHUR T. CAHILL.